(12) United States Patent
Crabtree et al.

(10) Patent No.: US 11,919,262 B2
(45) Date of Patent: Mar. 5, 2024

(54) METHOD FOR POST-PROCESSING AN ADDITIVELY MANUFACTURED PART

(71) Applicant: Additive Manufacturing Technologies Limited, Sheffield (GB)

(72) Inventors: Joseph Crabtree, Sheffield (GB); Konstantin Rybalcenko, Sheffield (GB); Ioannis Anastasopoulos, Sheffield (GB)

(73) Assignee: Additive Manufacturing Technologies Limited, Sheffield (GB)

( * ) Notice: Subject to any disclaimer, the term of this patent is extended or adjusted under 35 U.S.C. 154(b) by 0 days.

(21) Appl. No.: 17/905,122

(22) PCT Filed: Mar. 3, 2021

(86) PCT No.: PCT/GB2021/050532
§ 371 (c)(1),
(2) Date: Aug. 26, 2022

(87) PCT Pub. No.: WO2021/176217
PCT Pub. Date: Sep. 10, 2021

(65) Prior Publication Data
US 2023/0166466 A1 Jun. 1, 2023

(30) Foreign Application Priority Data

Mar. 3, 2020 (GB) ...................... 2003066
Jun. 15, 2020 (GB) ...................... 2009042

(51) Int. Cl.
*B29C 71/00* (2006.01)
*B29C 64/153* (2017.01)
(Continued)

(52) U.S. Cl.
CPC ........ *B29C 71/0009* (2013.01); *B29C 64/153* (2017.08); *B29C 64/188* (2017.08);
(Continued)

(58) Field of Classification Search
CPC .............. B29C 71/0009; B29C 64/188; B29C 2071/0027; B33Y 40/20
See application file for complete search history.

(56) References Cited

U.S. PATENT DOCUMENTS 8,123,999 B2 * 2/2012 Priedeman, Jr. ...... B29C 64/135
34/443
11,186,052 B2 * 11/2021 Klaczynski ............... F26B 9/06
(Continued)

FOREIGN PATENT DOCUMENTS

DE    102018121915 B3    2/2020
EP      3590687 A1       1/2020
(Continued)

OTHER PUBLICATIONS

Combined Search and Examination Report issued for United Kingdom Patent Application No. GB2003066.4, dated May 4, 2020, 7 pages.

(Continued)

*Primary Examiner* — Atul P. Khare
(74) *Attorney, Agent, or Firm* — Haynes and Boone, LLP

(57) ABSTRACT

The present application relates to a method for post-processing a powder-based additively manufactured part. The method comprising the steps of providing a powder-based additively manufactured part, the additively manufactured part comprising a material having a melting point, providing a fluid for processing the additively manufactured part in order to improve the surface finish of the additively manufactured part, wherein the fluid comprises at least one solvent selected from an organic ester, an aromatic organic compound or an acetal, a heating step, wherein the fluid is heated; and an application step, wherein the heated fluid is applied to a surface of the additively manufactured part. It has been found this process can help to improve the surface (Continued)

finish of the additively manufactured part, e.g. resulting in a less rough (i.e. smoother) surface finish.

21 Claims, 8 Drawing Sheets

(51) Int. Cl.
    *B29C 64/188*     (2017.01)
    *B29C 64/30*     (2017.01)
    *B33Y 10/00*     (2015.01)
    *B33Y 40/20*     (2020.01)
    *B33Y 80/00*     (2015.01)

(52) U.S. Cl.
    CPC ............... *B29C 64/30* (2017.08); *B33Y 10/00* (2014.12); *B33Y 40/20* (2020.01)

(56) References Cited

U.S. PATENT DOCUMENTS

| | | | |
|---|---|---|---|
| 11,597,146 B2* | 3/2023 | Arienti | B29C 64/188 |
| 11,633,913 B2* | 4/2023 | Luo | B05B 13/0242 |
| | | | 264/340 |
| 11,654,642 B2* | 5/2023 | Pfefferkorn | B29C 71/009 |
| | | | 264/341 |
| 2019/0375158 A1* | 12/2019 | Crabtree | B29C 64/35 |
| 2021/0197502 A1* | 7/2021 | Kramer | B29C 71/0009 |

FOREIGN PATENT DOCUMENTS

| | | | | |
|---|---|---|---|---|
| FR | 3022250 A1 * | 12/2015 | | B33Y 40/00 |
| GB | 2560073 A | 8/2018 | | |
| WO | WO 2016/201614 A1 | 12/2016 | | |
| WO | WO 2018/127683 A1 | 7/2018 | | |
| WO | WO 2019/179755 A1 | 9/2019 | | |
| WO | WO 2019/201932 A1 | 10/2019 | | |
| WO | WO 2020/049186 A1 | 3/2020 | | |

OTHER PUBLICATIONS

Combined Search and Examination Report issued for United Kingdom Patent Application No. GB2206285.5, dated Jul. 11, 2022, 6 pages.

Combined Search and Examination Report issued for United Kingdom Patent Application No. GB2103009.3, dated Aug. 19, 2021, 7 pages.

Search Report and Written Opinion issued for International Patent Application No. PCT/GB2021/050532, dated Aug. 11, 2021, ISA/EP, 17 pages.

* cited by examiner

METHOD FOR POST-PROCESSING AN ADDITIVELY MANUFACTURED PART

FIELD

The disclosure relates to a method for post-processing an additively manufactured part, a part obtainable via the same, and to an apparatus and system for performing the same.

BACKGROUND

Additive manufacturing, also called 3D printing, is a process during which an object is manufactured from a digital file using a layer-by-layer method. Common examples of additive manufacturing methods include selective laser sintering (SLS) and multi-jet fusion (MJF).

However, an issue with 3D printed components manufactured using powder-based additive manufacturing processes is that they often exhibit a rough surface finish.

It is therefore an aim of the present disclosure to address this problem.

SUMMARY

A first aspect of the disclosure provides a method for post-processing a powder-based additively manufactured part, the method comprising the steps of:
- providing a powder-based additively manufactured part, the additively manufactured part comprising a material having a melting point;
- providing a fluid for processing the additively manufactured part in order to improve the surface finish of the additively manufactured part, wherein the fluid comprises at least one acetal;
- a heating step, wherein the fluid is heated; and
- an application step, wherein the heated fluid is applied to a surface of the additively manufactured part.

Advantageously, it has been found that the steps of heating and applying at least one acetal to the surface of a powder-based additively manufactured part can help to improve the surface finish of the additively manufactured part, e.g. resulting in a less rough (i.e. smoother) surface finish.

In exemplary embodiments, the acetal has a formula $R_2C(OR')_2$.

In exemplary embodiments, each R is independently selected from: hydrogen, an optionally substituted alkyl, an optionally substituted heteroalkyl, an optionally substituted aryl or an optionally substituted heteroaryl, and each R' is independently selected from: an optionally substituted alkyl, an optionally substituted heteroalkyl, an optionally substituted aryl or an optionally substituted heteroaryl.

In exemplary embodiments, each R is independently selected from: hydrogen, a $C_1$ to $C_{10}$ optionally substituted alkyl or a $C_1$ to $C_{10}$ optionally substituted heteroalkyl.

In exemplary embodiments, each R is independently selected from: hydrogen, methyl, ethyl, propyl and butyl.

In exemplary embodiments, at least one R is hydrogen.

In exemplary embodiments, each R is hydrogen.

In exemplary embodiments, each R' is independently a $C_1$ to $C_{10}$ optionally substituted alkyl or a $C_1$ to $C_{10}$ optionally substituted heteroalkyl.

In exemplary embodiments, each R' is independently selected from: methyl, ethyl, propyl, butyl, pentyl and hexyl.

In exemplary embodiments, each R' is independently selected from: ethyl, propyl and butyl.

In exemplary embodiments, the additively manufactured part comprises a multi-layer structure.

In exemplary embodiments, the additively manufactured part comprises a sintered material.

In exemplary embodiments, the fluid comprises a combination of solvents.

In exemplary embodiments, at least one of solvents of said combination of solvents is selected from a group of solvents other than acetals.

In exemplary embodiments, each solvent of said combination of solvents is selected from an organic ester, an aromatic organic compound or an acetal.

In exemplary embodiments, the fluid comprises more than one solvent selected from the following groups: organic esters; an aromatic organic compound; and acetals.

In exemplary embodiments, wherein the fluid comprises a plurality of fluids.

In exemplary embodiments, at least one of the fluids of said plurality of fluids is one of: a polar or non-polar solvent; an acid; an alkali; or an oil.

In exemplary embodiments, the oil is an essential oil, optionally nutmeg oil.

Advantageously, it has been found that combining the at least one solvent with an essential oil can help to further improve the surface finish of the additively manufactured part.

In exemplary embodiments, the fluid comprises limonene.

Advantageously, it has been found that the use of limonene with the at least one solvent can help to further improve the surface finish of the additively manufactured part.

In exemplary embodiments, the fluid comprises peanut oil.

Advantageously, it has been found that combining the at least one solvent with peanut oil can help to further improve the surface finish of the additively manufactured part.

In exemplary embodiments, the fluid comprises rapeseed oil.

Advantageously, it has been found that combining the at least one solvent with rapeseed oil can help to further improve the surface finish of the additively manufactured part.

In exemplary embodiments, at least one of the fluids may be a plasticizer.

Advantageously, plasticizers can be used to promote smoothing of the surface of the part and can also help to counter any unwanted effects of the solvents.

In exemplary embodiments, the plasticizer may be selected from one of the following groups: essential oils; acetals; aromatic organic compounds; acids; ethers and chlorocarbons.

In exemplary embodiments, at least one of the fluids may be 2-methoxypropanol or n,n-dimethylacetamide.

Advantageously, 2-methoxypropanol or n,n-dimethylacetamide help to reduce the flammability and volatility of the solvent mixture.

In exemplary embodiments, the step of providing an additively manufactured part comprises additively manufacturing a part using a powder-based additive manufacturing method.

In exemplary embodiments, the step of providing the powder-based additively manufactured part comprises sintering the powder-based additively manufactured part.

In exemplary embodiments, the powder-based additive manufacturing method is selective laser sintering.

In exemplary embodiments, the powder-based additive manufacturing method is multi-jet fusion.

In exemplary embodiments, the material of the additively manufactured part is a thermoplastic material.

In exemplary embodiments, the part is manufactured from a polymer.

In exemplary embodiments, the polymer comprises a polyalkylene.

In exemplary embodiments, the polyalkylene is selected from: polyethylene, polypropylene, polybutylene or polypentylene In exemplary embodiments, the polymer comprises at least 50 mol % alkylene monomer, more typically at least 75 mol % alkylene monomer, and even more typically at least 90 mol % alkylene monomer.

In exemplary embodiments, the part comprises at least 50 wt. % polypropylene, more typically at least 75 wt. % polypropylene, and even more typically at least 90 wt. % polypropylene"

In exemplary embodiments, the material of the additively manufactured part is selected from one of Polypropylene; Thermoplastic Polyurethane; Nylon, Polyamide Bioplastic; Thermoplastic Elastomer; Acrylonitrile butadiene styrene; Acrylonitrile styrene acrylate; Polycarbonate; Polyvinylidene fluoride; Polyphenylene Sulfide; Polybutylene terephthalate; Polyether Ether Ketone; Polyether Ketone Ketone; Ethylene Propylene Diene Monomer Rubber; Nitrile Rubber; Polymethyl Methacrylate; Polyethylene; Polyethylene Furanoate; Polylactic Acid; Thermoplastic Polyamide; Polyoxymethylene; Polyvinyl Chloride; Thermoplastic Copolyester; Polyether Block Amide, Polyetherimide, or co-polymers or polymers derived from at least one of the listed polymers.

In exemplary embodiments, the material of the additively manufactured part is Nylon 12, Nylon 11 or Nylon 6.

In exemplary embodiments, the material of the additively manufactured part is ULTEM™ 9085 and/or ULTEM™ 1010.

In exemplary embodiments, the material of the additively manufactured part is Polyether Ether Ketone (PEEK).

In exemplary embodiments, the material of the additively manufactured part Polyether Ketone Ketone (PEKK).

In exemplary embodiments, the material of the additively manufactured part is Thermoplastic Polyurethane.

In exemplary embodiments, the material of the additively manufactured part is a chemical-resistant material (e.g. polypropylene).

In exemplary embodiments, the material of the additively manufactured part has a degree of crystallinity below 60%.

In exemplary embodiments, the material of the additively manufactured part has a degree of crystallinity in the range of 15% to 60%.

In exemplary embodiments, the material of the additively manufactured part has a degree of crystallinity in the range of 15% to 30%.

In exemplary embodiments, the material of the additively manufactured part is polypropylene.

In exemplary embodiments, the polypropylene may be a filament-based Polypropylene.

In exemplary embodiments, the application step comprises applying the fluid to the surface of the additively manufactured part at a temperature suitable for overcoming the bonds between particles of the material at the surface of the powder-based additively manufactured part, wherein said temperature is below the melting point of the material of the additively manufactured part.

It has been discovered that carrying out the application step at these temperatures can achieve an improved surface finish, without the risk of causing structural deformation to the part.

In exemplary embodiments, the heating step comprises heating the fluid to a temperature below the melting point of the material of the additively manufactured part.

Advantageously, heating the fluid to a temperature below the melting point of the material of the additively manufactured part can achieve an improved surface finish, without the risk of causing structural deformation to the part.

In exemplary embodiments, the heating step comprises heating the fluid to a temperature above the melting point of the solvent.

This has been found to be particular useful in embodiments where the fluid is a vapour.

In exemplary embodiments, the heating step comprises heating the fluid to a temperature close to the melting point of the material of the additively manufactured part.

Advantageously, it has been found that heating the fluid to temperatures close to the melting point of the material of the additively manufactured part can help to further improve the effectiveness of the process.

Furthermore, by heating the fluid to temperatures close to the melting point of the material of the additively manufactured part, it has also been found that chemical resistant materials (e.g. polypropylene) can be more easily processed to achieve an improved surface finish.

In exemplary embodiments, the application step comprises repeatedly applying the heated fluid to the surface of the additively manufactured part.

In exemplary embodiments, the method comprises a first phase and a second phase: wherein the first phase comprises providing a first fluid for processing the additively manufactured part in order to improve the surface finish of the additively manufactured part, wherein the first fluid comprises a first solvent, said solvent comprising an acetal, a first heating step, wherein the first fluid is heated, and a first application step, wherein the first heated fluid is applied to a surface of the additively manufactured part; and wherein the second phase comprises providing a second fluid, different to the first fluid, for processing the additively manufactured part in order to improve the surface finish of the additively manufactured part, wherein the second fluid comprises a second solvent, different to the first solvent, selected from an organic ester, an aromatic organic compound or an acetal, a second heating step, wherein the second fluid is heated, and a second application step, wherein the second heated fluid is applied to a surface of the additively manufactured part.

In exemplary embodiments, the fluid is provided in the form of a liquid.

In exemplary embodiments, the application step comprises submerging the additively manufactured part in the liquid.

Advantageously, it has been found that providing the fluid as a liquid and submerging (i.e. completely covering) the additively manufactured part into the liquid can help to more effectively improve the surface finish of the part.

Furthermore, providing the fluid as a liquid and submerging the additively manufactured part into the liquid can help to achieve faster processing times for chemical resistant materials (such as Polypropylene).

In exemplary embodiments, the heating step comprises heating the fluid to a temperature up to a maximum of 5° C. below the melting point of the material of the additively manufactured part.

Advantageously, it has been found that heating the fluid to temperatures up to a maximum of 5° C. below the melting point of the material of the additively manufactured part can help to reduce the likelihood of the part becoming structurally deformed.

In exemplary embodiments, the heating step comprises heating the fluid to a temperature no less than 80° C. below the melting point of the material of the additively manufactured part.

Advantageously, it has been found that heating the fluid to a temperature no less than 80° C. below the melting point of the material of the additively manufactured is particularly effective for processing chemical resistant materials (e.g. polypropylene) when using fluids comprising an acetal solvent.

In exemplary embodiments, the heating step comprises heating the fluid to a temperature of at least 80° C.

In exemplary embodiments, the heating step comprises heating the fluid to a temperature of at least 100° C.

Advantageously, it has been found that optimal processing using acetals can be obtained at temperatures of at least 100° C.

In exemplary embodiments, the heating step comprises heating the fluid to a temperature of no more than 160° C.

In exemplary embodiments, the heating step comprises heating the fluid to a temperature in the range of 80° C. to 160° C.

Advantageously, it has been found that heating the fluid to a temperature in the range of 80° C. to 160° C. is particularly effective for processing chemical resistant materials (e.g. polypropylene), when using fluids comprising an acetal solvent.

In exemplary embodiments, the acteal is selected from one of Formaldehyde Dibutyl Acetal, Aminoacetaldehyde Dimethyl Acetal, Acetaldehyde Diethyl Acetal, Acrolein Diethyl Acetal, Phenylacetaldehyde Dimethyl Acetal, Anisaldehyde Dimethyl Acetal, Citral Diethyl Acetal, 2,2-Diethoxyacetophenone and Ethyl Diethoxyacetate.

In exemplary embodiments, the acteal is selected from one of Formaldehyde Dibutyl Acetal, Aminoacetaldehyde Dimethyl Acetal, Acetaldehyde Diethyl Acetal, Acrolein Diethyl Acetal, Phenylacetaldehyde Dimethyl Acetal.

In exemplary embodiments, the acetal has a boiling point above 100° C.

Advantageously, it has been found that the smoothing process works more effectively when using acetals having a boiling point above 100° C.

In exemplary embodiments, the acetal is Anisaldehyde Dimethyl Acetal.

Advantageously, Anisaldehyde Dimethyl Acetal is a so called "green" material and hence its use can help to improve the surface finish of additively manufactured parts in an environmentally-friendly manner.

In exemplary embodiments, the acetal is Citral Diethyl Acetal

In exemplary embodiments, the acetal is 2,2-Diethoxyacetophenone.

Advantageously, 2,2-Diethoxyacetophenone is a so called "green" material and hence its use can help to improve the surface finish of additively manufactured parts in an environmentally-friendly manner.

In exemplary embodiments, the acetal is Ethyl Diethoxyacetate.

Advantageously, Ethyl Diethoxyacetate is a so called "green" material and hence its use can help to improve the surface finish of additively manufactured parts in an environmentally-friendly manner.

In exemplary embodiments, the acetal is Formaldehyde Dibutyl Acetal.

Advantageously, it has been found that Formaldehyde Dibutyl Acetal is even more effective at improving the surface finish of additively manufactured parts, particularly for chemical resistant materials (e.g. polypropylene).

Furthermore, Formaldehyde Dibutyl Acetal is a so called "green" material and hence its use can help to improve the surface finish of additively manufactured parts in an environmentally-friendly manner.

In exemplary embodiments, the heating step comprises heating the fluid to a temperature no less than 30° C. below the melting point of the material of the additively manufactured part.

Advantageously, it has been found that heating the fluid to a temperature no less than 30° C. below the melting point of the material of the additively manufactured is optimal for processing chemical resistant materials (e.g. polypropylene) when using fluids comprising Formaldehyde Dibutyl Acetal.

In exemplary embodiments, the heating step comprises heating the fluid to a temperature of at least 115° C.

In exemplary embodiments, the heating step comprises heating the fluid to a temperature of no more than 140° C.

In exemplary embodiments, the heating step comprises heating the fluid to a temperature in the range of 115° C. to 140° C.

Advantageously, it has been found that heating the fluid to a temperature in the range of 115° C. to 140° C. is optimal for processing chemical resistant materials (e.g. polypropylene), when using fluids comprising Formaldehyde Dibutyl Acetal.

In exemplary embodiments, the acetal is Aminoacetaldehyde Dimethyl Acetal.

In exemplary embodiments, the heating step comprises heating the fluid to a temperature no less than 30° C. below the melting point of the material of the additively manufactured part.

Advantageously, it has been found that heating the fluid to a temperature no less than 30° C. below the melting point of the material of the additively manufactured is optimal for processing chemical resistant materials (e.g. polypropylene) when using fluids comprising Aminoacetaldehyde Dimethyl Acetal.

In exemplary embodiments, the heating step comprises heating the fluid to a temperature of at least 115° C.

In exemplary embodiments, the heating step comprises heating the fluid to a temperature of no more than 140° C.

In exemplary embodiments, the heating step comprises heating the fluid to a temperature in the range of 115° C. to 140° C.

Advantageously, it has been found that heating the fluid to a temperature in the range of 115° C. to 140° C. is optimal for processing chemical resistant materials (e.g. polypropylene), when using fluids comprising Aminoacetaldehyde Dimethyl Acetal.

In exemplary embodiments, the acetal is Acetaldehyde Diethyl Acetal.

In exemplary embodiments, the heating step comprises heating the fluid to a temperature up to a maximum of 25° C. below the melting point of the material of the additively manufactured part.

Advantageously, it has been found that heating the fluid to temperatures up to a maximum of 25° C. below the melting point of the material of the additively manufactured part can help to reduce the likelihood of the part becoming structurally deformed when using an Acetaldehyde Diethyl Acetal solvent.

In exemplary embodiments, the heating step comprises heating the fluid to a temperature no less than 50° C. below the melting point of the material of the additively manufactured part.

Advantageously, it has been found that heating the fluid to a temperature no less than 50° C. below the melting point of the material of the additively manufactured is optimal for processing chemical resistant materials (e.g. polypropylene) when using fluids comprising Acetaldehyde Diethyl Acetal.

In exemplary embodiments, the heating step comprises heating the fluid to a temperature of at least 90° C.

In exemplary embodiments, the heating step comprises heating the fluid to a temperature of no more than 105° C.

In exemplary embodiments, the heating step comprises heating the fluid to a temperature in the range of 90° C. to 105° C.

Advantageously, it has been found that heating the fluid to a temperature in the range of 90° C. to 105° C. is optimal for processing chemical resistant materials (e.g. polypropylene), when using fluids comprising Acetaldehyde Diethyl Acetal.

In exemplary embodiments, the acetal is Acrolein Diethyl Acetal.

In exemplary embodiments, the heating step comprises heating the fluid to a temperature no less than 30° C. below the melting point of the material of the additively manufactured part.

Advantageously, it has been found that heating the fluid to a temperature no less than 30° C. below the melting point of the material of the additively manufactured is optimal for processing chemical resistant materials (e.g. polypropylene) when using fluids comprising Acrolein Diethyl Acetal.

In exemplary embodiments, the heating step comprises heating the fluid to a temperature of at least 90° C.

In exemplary embodiments, the heating step comprises heating the fluid to a temperature of no more than 135° C.

In exemplary embodiments, the heating step comprises heating the fluid to a temperature in the range of 90° C. to 135° C.

Advantageously, it has been found that heating the fluid to a temperature in the range of 90° C. to 135° C. is optimal for processing chemical resistant materials (e.g. polypropylene), when using fluids comprising Acrolein Diethyl Acetal.

In exemplary embodiments, the acetal is Phenylacetaldehyde Dimethyl Acetal.

Advantageously, Phenylacetaldehyde Dimethyl Acetal is a so called "green" material and hence its use can help to improve the surface finish of additively manufactured parts in an environmentally-friendly manner.

In exemplary embodiments, the heating step comprises heating the fluid to a temperature no less than 30° C. below the melting point of the material of the additively manufactured part.

Advantageously, it has been found that heating the fluid to a temperature no less than 30° C. below the melting point of the material of the additively manufactured is optimal for processing chemical resistant materials (e.g. polypropylene) when using fluids comprising Phenylacetaldehyde Dimethyl Acetal.

In exemplary embodiments, the heating step comprises heating the fluid to a temperature of at least 115° C.

In exemplary embodiments, the heating step comprises heating the fluid to a temperature of no more than 140° C.

In exemplary embodiments, the heating step comprises heating the fluid to a temperature in the range of 115° C. to 140° C.

Advantageously, it has been found that heating the fluid to a temperature in the range of 115° C. to 140° C. is optimal for processing chemical resistant materials (e.g. polypropylene), when using fluids comprising Phenylacetaldehyde Dimethyl Acetal.

In exemplary embodiments, the application step is performed at atmospheric pressure.

Advantageously, the method of processing the additively manufactured part using a liquid does not require the application of pressure, and it is therefore possible to avoid the need for expensive pressure chambers and pumping systems. This help parts to be processed more economically.

In exemplary embodiments, the additively manufactured part is submerged in the liquid for at least 1 minute.

In exemplary embodiments, the additively manufactured part is submerged in the liquid for at least 2 minutes.

In exemplary embodiments, the additively manufactured part is submerged in the liquid for up to 2 hours.

In exemplary embodiments, the method comprises washing the additively manufactured part after the fluid has been applied onto the surface of the additively manufactured part.

In exemplary embodiments, the step of washing the additively manufactured part comprises rinsing (i.e. subjecting at least some of the part to a fluid flow) the part.

In exemplary embodiments, the step of rinsing the additively manufactured parts is performed with one of water, alcohol, acetone or another alcohol, solvent, acid, alkali or oil.

Advantageously, washing (i.e. applying a fluid to at least some of the part) helps to remove any unwanted solvent from the part after processing, which helps to avoid any unwanted removal of material from the part or other adverse effects which may be caused by over-exposure to the solvent.

In exemplary embodiments, the method further comprises drying the additively manufactured part after the fluid has been applied onto the surface of the additively manufactured part.

In exemplary embodiments, the drying step comprises placing the additively manufactured part into a processing chamber (i.e. an oven) and altering at least one of a temperature of the processing chamber, a pressure applied to the processing chamber and/or processing time during the drying process based on a surface crystallinity of the additively manufactured part.

It has been found manipulating the drying conditions based on the surface crystallinity of the part can help to improve the texture, gloss level and/or colour of the part.

It has also been found that this effect is particularly prevalent for polypropylene parts due to the specific molecular structure of polypropylene.

In exemplary embodiments, the drying step comprises heating the additively manufactured part to a temperature above a boiling point of the fluid.

Advantageously, drying the part helps to remove any unwanted solvent from the part after processing, which helps to avoid any unwanted removal of material from the part or other adverse effects which may be caused by over-exposure to the solvent.

In exemplary embodiments, the drying step comprises heating the additively manufactured part to a temperature in the range of 70° C. to 100° C.

In exemplary embodiments, the drying step comprises heating the additively manufactured part to a temperature in the range of 80° C. to 90° C.

In exemplary embodiments, the drying step comprises heating the additively manufactured part for approximately 30 minutes.

Advantageously, the aforementioned drying steps help to better stabilise the additively manufactured part after processing, which helps to prevent crystallisation of the surface of the part which can lead to discolouration.

In exemplary embodiments, the fluid is provided in the form of a gas (e.g. a vapour).

In exemplary embodiments, the heating step comprises heating the fluid to a temperature above a boiling point of the fluid such that the fluid is vaporised.

In exemplary embodiments, the application step comprises condensing the solvent vapour onto a surface of the additively manufactured part.

Advantageously, it has been found that providing the fluid as a vapour and condensing the fluid onto the part is an easily automatable method and can therefore help to reduce operator workload.

Furthermore, providing the fluid as a vapour can help the method to be performed in a safer and more practical working environment.

In addition, when used in combination with a drying process, it is possible for drying to be performed in the same processing chamber as that which is used for post-processing of the part, and hence processing efficiency can be further improved.

In exemplary embodiments, the solvent vapour is applied to a surface of the additively manufactured part for a period of time in the range of 1 hour to 6 hours.

In exemplary embodiments, the heating step comprises heating the fluid to a temperature up to a maximum of 5° C. below the melting point of the material of the additively manufactured part.

Advantageously, it has been found that heating the fluid to temperatures up to a maximum of 5° C. below the melting point of the material of the additively manufactured part can help to reduce the likelihood of the part becoming structurally deformed.

In exemplary embodiments, the heating step comprises heating the fluid to a temperature up to a maximum of 10° C. below the melting point of the material of the additively manufactured part.

Advantageously, it has been found that heating the fluid to temperatures up to a maximum of 10° C. below the melting point of the material of the additively manufactured part can help to further reduce the likelihood of the part becoming structurally deformed.

In exemplary embodiments, the heating step comprises heating the fluid to a temperature no less than 60° C. below the melting point of the material of the additively manufactured part.

Advantageously, it has been found that heating the fluid to a temperature no less than 60° C. below the melting point of the material of the additively manufactured is particularly effective for processing chemical resistant materials (e.g. polypropylene) when using fluids comprising an acetal solvent in a vapour based method.

In exemplary embodiments, the heating step comprises heating the fluid to a temperature of at least 100° C.

In exemplary embodiments, the heating step comprises heating the fluid to a temperature of no more than 150° C.

In exemplary embodiments, the heating step comprises heating the fluid to a temperature in the range of 100° C. to 150° C.

Advantageously, it has been found that heating the fluid to a temperature in the range of 100° C. to 150° C. is particularly effective for processing chemical resistant materials (e.g. polypropylene), when using fluids comprising an acetal solvent in a vapour based method.

In exemplary embodiments, the method further comprises, prior to the application step, a part heating step wherein the additively manufactured part is heated to a temperature below the melting point of the material of the additively manufactured part.

Advantageously, it has been found that heating the additively manufactured part prior to the application step helps improve the efficiency of the process.

In exemplary embodiments, the part heating step comprises heating the part to a temperature up to a maximum of 5° C. below the melting point of the material of the additively manufactured part.

In exemplary embodiments, the part heating step comprises heating the part to a temperature of no more than 130° C.

In exemplary embodiments, the method comprises placing the additively manufactured part into a processing chamber, and applying a negative pressure to the processing chamber.

Advantageously, by applying a negative pressure to the processing chamber, it is possible to vaporise the solvent at lower temperatures than would otherwise be obtainable. This can help to further reduce the likelihood of the part becoming structurally deformed due to temperature.

In exemplary embodiments, the processing chamber is maintained at a pressure less than 1 bar.

Advantageously, due to the thermodynamic performance of the solvent, it has been found that processing can be performed more effectively at pressures below 1 bar.

In exemplary embodiments, the processing chamber is maintained at a pressure in the range of 10 mbar to 1000 mbar.

Advantageously, due to the thermodynamic performance of the solvent, it has been found that processing can be performed even more effectively at pressures between 10 mbar and 1000 mbar.

In exemplary embodiments, the processing chamber is maintained at a pressure in the range of 70 mbar to 400 mbar.

Advantageously, due to the thermodynamic performance of the solvent, it has been found that processing can be performed most effectively at pressures between 70 mbar and 400 mbar.

In exemplary embodiments, the method comprises placing the additively manufactured part into the, or a, processing chamber, and the drying step comprises applying a negative pressure to the processing chamber.

Advantageously, by applying a negative pressure to the processing chamber, it is possible to vaporise the fluid at lower temperatures than would otherwise be obtainable. This can help to further reduce the likelihood of the part becoming structurally deformed due to temperature.

In exemplary embodiments, the drying step comprises heating the additively manufactured part to a temperature in the range of 70° C. to 100° C.

In exemplary embodiments, the drying step comprises heating the additively manufactured part to a temperature in the range of 80° C. to 90° C.

In exemplary embodiments, the drying step comprises heating the additively manufactured part for approximately 30 minutes.

Advantageously, the aforementioned drying steps help to better stabilise the additively manufactured part after processing, which helps to prevent crystallisation of the surface of the part which can lead to discolouration.

A second aspect of the disclosure provides a part obtainable via the method according to the first aspect of the disclosure.

A third aspect of the disclosure provides a method for post-processing a powder-based additively manufactured part, the method comprising the steps of:
- providing a powder-based additively manufactured part, the additively manufactured part comprising a material having a melting point, wherein said material comprises polypropylene;
- providing a fluid for processing the additively manufactured part in order to improve the surface finish of the additively manufactured part, wherein the fluid comprises acetophenone;
- a heating step, wherein the fluid is heated; and
- an application step, wherein the heated fluid is applied to a surface of the additively manufactured part.

Advantageously, it has been found that the steps of heating and applying fluids comprising acetophenone to the surface of a powder-based additively manufactured polypropylene part can help to improve the surface finish of the additively manufactured polypropylene part, e.g. resulting in a less rough (i.e. smoother) surface finish.

Advantageously, Acetophenone is a so called "green" material and hence its use can help to improve the surface finish of additively manufactured parts in an environmentally-friendly manner.

Furthermore, it has been found that Acetophenone is particularly effective at improving the surface finish of additively manufactured parts, particularly for chemical resistant materials (e.g. polypropylene).

In exemplary embodiments, the additively manufactured part comprises a multi-layer structure.

In exemplary embodiments, the additively manufactured part comprises a sintered material.

In exemplary embodiments, the fluid comprises a combination of solvents.

In exemplary embodiments, at least one of solvents of said combination of solvents is selected from a group of solvents other than aromatic organic compounds.

In exemplary embodiments, each solvent of said combination of solvents is selected from an organic ester, an aromatic organic compound or an acetal.

In exemplary embodiments, the fluid comprises more than one solvent selected from the following groups: organic esters; an aromatic organic compounds; and acetals.

In exemplary embodiments, wherein the fluid comprises a plurality of fluids.

In exemplary embodiments, at least one of the fluids of said plurality of fluids is one of: a polar or non-polar solvent; an acid; an alkali; or an oil.

In exemplary embodiments, the oil is an essential oil, optionally nutmeg oil.

Advantageously, it has been found that combining the at least one solvent with an essential oil can help to further improve the surface finish of the additively manufactured part.

In exemplary embodiments, the fluid comprises limonene.

Advantageously, it has been found that the use of limonene with the at least one solvent can help to further improve the surface finish of the additively manufactured part.

In exemplary embodiments, the fluid comprises peanut oil.

Advantageously, it has been found that combining the at least one solvent with peanut oil can help to further improve the surface finish of the additively manufactured part.

In exemplary embodiments, the fluid comprises rapeseed oil.

Advantageously, it has been found that combining the at least one solvent with rapeseed oil can help to further improve the surface finish of the additively manufactured part.

In exemplary embodiments, at least one of the fluids may be a plasticizer.

Advantageously, plasticizers can be used to promote smoothing of the surface of the part and can also help to counter any unwanted effects of the solvents.

In exemplary embodiments, the plasticizer may be selected from one of the following groups: essential oils; acetals; aromatic organic compounds; acids; ethers and chlorocarbons.

In exemplary embodiments, at least one of the fluids may be 2-methoxypropanol or n,n-dimethylacetamide.

Advantageously, 2-methoxypropanol or n,n-dimethylacetamide help to reduce the flammability and volatility of the solvent mixture.

In exemplary embodiments, the step of providing an additively manufactured part comprises additively manufacturing a part using a powder-based additive manufacturing method.

In exemplary embodiments, the step of providing the powder-based additively manufactured part comprises sintering the powder-based additively manufactured part.

In exemplary embodiments, the powder-based additive manufacturing method is selective laser sintering.

In exemplary embodiments, the powder-based additive manufacturing method is multi-jet fusion.

In exemplary embodiments, the polypropylene may be a filament-based Polypropylene.

In exemplary embodiments, the application step comprises applying the fluid to the surface of the additively manufactured part at a temperature suitable for overcoming the bonds between particles of the material at the surface of the powder-based additively manufactured part, wherein said temperature is below the melting point of the material of the additively manufactured part.

It has been discovered that carrying out the application step at these temperatures can achieve an improved surface finish, without the risk of causing structural deformation to the part.

In exemplary embodiments, the heating step comprises heating the fluid to a temperature below the melting point of the material of the additively manufactured part.

Advantageously, heating the fluid to a temperature below the melting point of the material of the additively manufactured part can achieve an improved surface finish, without the risk of causing structural deformation to the part.

In exemplary embodiments, the heating step comprises heating the fluid to a temperature above the melting point of the solvent.

This has been found to be particular useful in embodiments where the fluid is a vapour.

In exemplary embodiments, the heating step comprises heating the fluid to a temperature close to the melting point of the material of the additively manufactured part.

Advantageously, it has been found that heating the fluid to temperatures close to the melting point of the material of the additively manufactured part can help to further improve the effectiveness of the process.

Furthermore, by heating the fluid to temperatures close to the melting point of the material of the additively manufactured part, it has also been found that chemical resistant materials (e.g. polypropylene) can be more easily processed to achieve an improved surface finish.

In exemplary embodiments, the application step comprises repeatedly applying the heated fluid to the surface of the additively manufactured part.

In exemplary embodiments, the method comprises a first phase and a second phase: wherein the first phase comprises providing a first fluid for processing the additively manufactured part in order to improve the surface finish of the additively manufactured part, wherein the first fluid comprises a first solvent, said solvent comprising acetophenone, a first heating step, wherein the first fluid is heated, and a first application step, wherein the first heated fluid is applied to a surface of the additively manufactured part; and wherein the second phase comprises providing a second fluid, different to the first fluid, for processing the additively manufactured part in order to improve the surface finish of the additively manufactured part, wherein the second fluid comprises a second solvent, different to the first solvent, selected from an organic ester, an aromatic organic compound or an acetal, a second heating step, wherein the second fluid is heated, and a second application step, wherein the second heated fluid is applied to a surface of the additively manufactured part.

In exemplary embodiments, the fluid is provided in the form of a liquid.

In exemplary embodiments, the application step comprises submerging the additively manufactured part in the liquid.

Advantageously, it has been found that providing the fluid as a liquid and submerging (i.e. completely covering) the additively manufactured part into the liquid can help to more effectively improve the surface finish of the part.

Furthermore, providing the fluid as a liquid and submerging the additively manufactured part into the liquid can help to achieve faster processing times for chemical resistant materials (such as Polypropylene).

In exemplary embodiments, the heating step comprises heating the fluid to a temperature up to a maximum of 5° C. below the melting point of the material of the additively manufactured part.

Advantageously, it has been found that heating the fluid to temperatures up to a maximum of 5° C. below the melting point of the material of the additively manufactured part can help to reduce the likelihood of the part becoming structurally deformed.

In exemplary embodiments, the heating step comprises heating the fluid to a temperature no less than 50° C. below the melting point of the material of the additively manufactured part.

Advantageously, it has been found that heating the fluid to a temperature no less than 50° C. below the melting point of the material of the additively manufactured is particularly effective for processing polypropylene when using fluids comprising an acetophenone solvent.

In exemplary embodiments, the heating step comprises heating the fluid to a temperature no less than 30° C. below the melting point of the material of the additively manufactured part.

Advantageously, it has been found that heating the fluid to a temperature no less than 30° C. below the melting point of the material of the additively manufactured is even more effective for processing polypropylene when using fluids comprising an acetophenone solvent.

In exemplary embodiments, the heating step comprises heating the fluid to a temperature of at least 110° C.

In exemplary embodiments, the heating step comprises heating the fluid to a temperature of no more than 160° C.

In exemplary embodiments, the heating step comprises heating the fluid to a temperature in the range of 110° C. to 160° C.

Advantageously, it has been found that heating the fluid to a temperature in the range of 110° C. to 160° C. is particularly effective for processing polypropylene, when using fluids comprising an acetophenone solvent.

In exemplary embodiments, the heating step comprises heating the fluid to a temperature of at least 115° C.

In exemplary embodiments, the heating step comprises heating the fluid to a temperature of no more than 135° C.

In exemplary embodiments, the heating step comprises heating the fluid to a temperature in the range of 115° C. to 135° C.

Advantageously, it has been found that heating the fluid to a temperature in the range of 115° C. to 135° C. is even more effective for processing polypropylene, when using fluids comprising an acetophenone solvent, without risking damage to the part.

In exemplary embodiments, the application step is performed at atmospheric pressure.

Advantageously, the method of processing the additively manufactured part using a liquid does not require the application of pressure, and it is therefore possible to avoid the need for expensive pressure chambers and pumping systems. This help parts to be processed more economically.

In exemplary embodiments, the additively manufactured part is submerged in the liquid for at least 2 minutes.

In exemplary embodiments, the additively manufactured part is submerged in the liquid for up to 2 hours.

In exemplary embodiments, the method comprises washing the additively manufactured part after the fluid has been applied onto the surface of the additively manufactured part.

In exemplary embodiments, the step of washing the additively manufactured part comprises rinsing (i.e. subjecting at least some of the part to a fluid flow) the part.

In exemplary embodiments, the step of rinsing the additively manufactured parts is performed with one of water, alcohol, acetone or another alcohol, solvent, acid, alkali or oil.

Advantageously, washing (i.e. applying a fluid to at least some of the part) helps to remove any unwanted solvent from the part after processing, which helps to avoid any unwanted removal of material from the part or other adverse effects which may be caused by over-exposure to the solvent.

In exemplary embodiments, the method further comprises drying the additively manufactured part after the fluid has been applied onto the surface of the additively manufactured part.

In exemplary embodiments, the drying step comprises placing the additively manufactured part into a processing chamber (i.e. an oven) and altering at least one of a temperature of the processing chamber, a pressure applied to the processing chamber and/or processing time during the drying process based on a surface crystallinity of the additively manufactured part.

It has been found manipulating the drying conditions based on the surface crystallinity of the part can help to improve the texture, gloss level and/or colour of the part.

It has also been found that this effect is particularly prevalent for polypropylene parts due to the specific molecular structure of polypropylene.

In exemplary embodiments, the drying step comprises heating the additively manufactured part to a temperature above a boiling point of the fluid.

Advantageously, drying the part helps to remove any unwanted solvent from the part after processing, which helps to avoid any unwanted removal of material from the part or other adverse effects which may be caused by over-exposure to the solvent.

In exemplary embodiments, the drying step comprises heating the additively manufactured part to a temperature in the range of 70° C. to 100° C.

In exemplary embodiments, the drying step comprises heating the additively manufactured part to a temperature in the range of 80° C. to 90° C.

In exemplary embodiments, the drying step comprises heating the additively manufactured part for approximately 30 minutes.

Advantageously, the aforementioned drying steps help to better stabilise the additively manufactured part after processing, which helps to prevent crystallisation of the surface of the part which can lead to discolouration.

In exemplary embodiments, the fluid is provided in the form of a gas (e.g. a vapour).

In exemplary embodiments, the heating step comprises heating the fluid to a temperature above a boiling point of the fluid such that the fluid is vaporised.

In exemplary embodiments, the application step comprises condensing the solvent vapour onto a surface of the additively manufactured part.

Advantageously, it has been found that providing the fluid as a vapour and condensing the fluid onto the part is an easily automatable method and can therefore help to reduce operator workload.

Furthermore, providing the fluid as a vapour can help the method to be performed in a safer and more practical working environment.

In addition, when used in combination with a drying process, it is possible for drying to be performed in the same processing chamber as that which is used for post-processing of the part, and hence processing efficiency can be further improved.

In exemplary embodiments, the solvent vapour is applied to a surface of the additively manufactured part for a period of time in the range of 1 hour to 6 hours.

In exemplary embodiments, the heating step comprises heating the fluid to a temperature up to a maximum of 5° C. below the melting point of the material of the additively manufactured part.

Advantageously, it has been found that heating the fluid to temperatures up to a maximum of 5° C. below the melting point of the material of the additively manufactured part can help to reduce the likelihood of the part becoming structurally deformed.

In exemplary embodiments, the heating step comprises heating the fluid to a temperature no more than 60° C. below the melting point of the material of the additively manufactured part.

Advantageously, it has been found that heating the fluid to a temperature no more than 60° C. below the melting point of the material of the additively manufactured is particularly effective for processing polypropylene when using fluids comprising acetophenone in a vapour based method.

In exemplary embodiments, the heating step comprises heating the fluid to a temperature of at least 100° C.

In exemplary embodiments, the heating step comprises heating the fluid to a temperature of no more than 150° C.

In exemplary embodiments, the heating step comprises heating the fluid to a temperature in the range of 100° C. to 150° C.

Advantageously, it has been found that heating the fluid to a temperature in the range of 100° C. to 150° C. is particularly effective for processing polypropylene, when using fluids comprising acetophenone in a vapour based method.

In exemplary embodiments, the method comprises placing the additively manufactured part into a processing chamber, and applying a negative pressure to the processing chamber.

Advantageously, by applying a negative pressure to the processing chamber, it is possible to vaporise the solvent at lower temperatures than would otherwise be obtainable, as is demonstrated by the graph shown in FIG. 5. This can help to further reduce the likelihood of the part becoming structurally deformed due to temperature.

In exemplary embodiments, the processing chamber is maintained at a pressure less than 1 bar.

Advantageously, due to the thermodynamic performance of the solvent as shown in FIG. 5, it has been found that processing can be performed more effectively at pressures below 1 bar.

In exemplary embodiments, the processing chamber is maintained at a pressure in the range of 10 mbar to 1000 mbar.

Advantageously, due to the thermodynamic performance of the solvent (see FIG. 5), it has been found that processing can be performed even more effectively at pressures between 10 mbar and 1000 mbar.

In exemplary embodiments, the processing chamber is maintained at a pressure in the range of 70 mbar to 400 mbar.

Advantageously, due to the thermodynamic performance of the solvent (see FIG. 5), it has been found that processing can be performed most effectively at pressures between 70 mbar and 400 mbar.

In exemplary embodiments, the method comprises placing the additively manufactured part into the, or a, processing chamber, and the drying step comprises applying a negative pressure to the processing chamber.

Advantageously, by applying a negative pressure to the processing chamber, it is possible to vaporise the fluid at lower temperatures than would otherwise be obtainable. This can help to further reduce the likelihood of the part becoming structurally deformed due to temperature.

In exemplary embodiments, the drying step comprises heating the additively manufactured part to a temperature in the range of 70° C. to 100° C.

In exemplary embodiments, the drying step comprises heating the additively manufactured part to a temperature in the range of 80° C. to 90° C.

In exemplary embodiments, the drying step comprises heating the additively manufactured part for approximately 30 minutes.

Advantageously, the aforementioned drying steps help to better stabilise the additively manufactured part after processing, which helps to prevent crystallisation of the surface of the part which can lead to discolouration.

In exemplary embodiments, the method comprises cooling the additively manufactured part to a temperature in the range of −30° C. to 70° C.

Advantageously, cooling the additively manufactured part to such temperatures has been found to modify the surface crystallinity of the part.

A fourth aspect of the disclosure provides a part obtainable via the method according to the third aspect of the disclosure.

A fifth aspect of the disclosure provides a method for post-processing a powder-based additively manufactured part, the method comprising the steps of:
- providing a powder-based additively manufactured part, the additively manufactured part comprising a material having a melting point;
- providing a fluid for processing the additively manufactured part in order to improve the surface finish of the additively manufactured part, wherein the fluid comprises at least one organic ester;
- a heating step, wherein the fluid is heated; and
- an application step, wherein the heated fluid is applied to a surface of the additively manufactured part.

Advantageously, it has been found that the steps of heating and applying fluids comprising at least one organic ester to the surface of a powder-based additively manufactured part can help to improve the surface finish of the additively manufactured part, e.g. resulting in a less rough (i.e. smoother) surface finish.

In exemplary embodiments, the organic ester has a formula RCOOR', each R is independently selected from: hydrogen, an optionally substituted alkyl, an optionally substituted heteroalkyl, an optionally substituted aryl or an optionally substituted heteroaryl, and each R' is independently selected from: an optionally substituted alkyl, an optionally substituted heteroalkyl, an optionally substituted aryl or an optionally substituted heteroaryl.

In exemplary embodiments, each R is independently selected from: hydrogen, a $C_1$ to $C_{10}$ optionally substituted alkyl or a $C_1$ to $C_{10}$ optionally substituted heteroalkyl.

In exemplary embodiments, each R is independently selected from: hydrogen, methyl, ethyl, propyl, butyl and pentyl.

In exemplary embodiments, each R is independently selected from optionally substituted aryl or an optionally substituted heteroaryl.

In exemplary embodiments, each R is independently selected from optionally substituted aryl.

In exemplary embodiments, each R is benzyl.

In exemplary embodiments, each R' is independently a $C_1$ to $C_{10}$ optionally substituted alkyl or a $C_1$ to $C_{10}$ optionally substituted heteroalkyl.

In exemplary embodiments, each R' is independently selected from: methyl, ethyl, propyl, butyl, pentyl and hexyl.

In exemplary embodiments, each R' is methyl.

In exemplary embodiments, the organic ester is an acetate ester.

In exemplary embodiments, the additively manufactured part comprises a multi-layer structure.

In exemplary embodiments, the additively manufactured part comprises a sintered material.

In exemplary embodiments, the fluid comprises a combination of solvents.

In exemplary embodiments, at least one of solvents of said combination of solvents is selected from a group of solvents other than organic esters.

In exemplary embodiments, each solvent of said combination of solvents is selected from an organic ester, an aromatic organic compound or an acetal.

In exemplary embodiments, the fluid comprises more than one solvent selected from the following groups: organic esters; an aromatic organic compounds; and acetals.

In exemplary embodiments, wherein the fluid comprises a plurality of fluids.

In exemplary embodiments, at least one of the fluids of said plurality of fluids is one of: a polar or non-polar solvent; an acid; an alkali; or an oil.

In exemplary embodiments, the oil is an essential oil, optionally nutmeg oil. Advantageously, it has been found that combining the at least one solvent with an essential oil can help to further improve the surface finish of the additively manufactured part.

In exemplary embodiments, the fluid comprises limonene.

Advantageously, it has been found that the use of limonene with the at least one solvent can help to further improve the surface finish of the additively manufactured part.

In exemplary embodiments, the fluid comprises peanut oil.

Advantageously, it has been found that combining the at least one solvent with peanut oil can help to further improve the surface finish of the additively manufactured part.

In exemplary embodiments, the fluid comprises rapeseed oil.

Advantageously, it has been found that combining the at least one solvent with rapeseed oil can help to further improve the surface finish of the additively manufactured part.

In exemplary embodiments, at least one of the fluids may be a plasticizer.

Advantageously, plasticizers can be used to promote smoothing of the surface of the part and can also help to counter any unwanted effects of the solvents.

In exemplary embodiments, the plasticizer may be selected from one of the following groups: essential oils; acetals; aromatic organic compounds; acids; ethers and chlorocarbons.

In exemplary embodiments, at least one of the fluids may be 2-methoxypropanol or n,n-dimethylacetamide.

Advantageously, 2-methoxypropanol or n,n-dimethylacetamide help to reduce the flammability and volatility of the solvent mixture.

In exemplary embodiments, the step of providing an additively manufactured part comprises additively manufacturing a part using a powder-based additive manufacturing method.

In exemplary embodiments, the step of providing the powder-based additively manufactured part comprises sintering the powder-based additively manufactured part.

In exemplary embodiments, the powder-based additive manufacturing method is selective laser sintering.

In exemplary embodiments, the powder-based additive manufacturing method is multi-jet fusion.

In exemplary embodiments, the material of the additively manufactured part is a thermoplastic material.

In exemplary embodiments, the part is manufactured from a polymer.

In exemplary embodiments, the polymer comprises a polyalkylene.

In exemplary embodiments, the polyalkylene is selected from: polyethylene, polypropylene, polybutylene or polypentylene In exemplary embodiments, the polymer comprises at least 50 mol % alkylene monomer, more typically at least 75 mol % alkylene monomer, and even more typically at least 90 mol % alkylene monomer.

In exemplary embodiments, the part comprises at least 50 wt. % polypropylene, more typically at least 75 wt. % polypropylene, and even more typically at least 90 wt. % polypropylene"

In exemplary embodiments, the material of the additively manufactured part is selected from one of Polypropylene; Thermoplastic Polyurethane; Nylon, Polyamide Bioplastic; Thermoplastic Elastomer; Acrylonitrile butadiene styrene; Acrylonitrile styrene acrylate; Polycarbonate; Polyvinylidene fluoride; Polyphenylene Sulfide; Polybutylene terephthalate; Polyether Ether Ketone; Polyether Ketone Ketone; Ethylene Propylene Diene Monomer Rubber; Nitrile Rubber; Polymethyl Methacrylate; Polyethylene; Polyethylene Furanoate; Polylactic Acid; Thermoplastic Polyamide; Polyoxymethylene; Polyvinyl Chloride; Thermoplastic Copolyester; Polyether Block Amide, Polyetherimide, or co-polymers or polymers derived from at least one of the listed polymers.

In exemplary embodiments, the material of the additively manufactured part is Nylon 12, Nylon 11 or Nylon 6.

In exemplary embodiments, the material of the additively manufactured part is ULTEM™ 9085 and/or ULTEM™ 1010.

In exemplary embodiments, the material of the additively manufactured part is Polyether Ether Ketone (PEEK).

In exemplary embodiments, the material of the additively manufactured part Polyether Ketone Ketone (PEKK).

In exemplary embodiments, the material of the additively manufactured part is Thermoplastic Polyurethane.

In exemplary embodiments, the material of the additively manufactured part is a chemical-resistant material (e.g. polypropylene).

In exemplary embodiments, the material of the additively manufactured part has a degree of crystallinity below 60%.

In exemplary embodiments, the material of the additively manufactured part has a degree of crystallinity in the range of 15% to 60%.

In exemplary embodiments, the material of the additively manufactured part has a degree of crystallinity in the range of 15% to 30%.

In exemplary embodiments, the material of the additively manufactured part is polypropylene.

In exemplary embodiments, the polypropylene may be a filament-based Polypropylene.

In exemplary embodiments, the application step comprises applying the fluid to the surface of the additively manufactured part at a temperature suitable for overcoming the bonds between particles of the material at the surface of the powder-based additively manufactured part, wherein said temperature is below the melting point of the material of the additively manufactured part.

It has been discovered that carrying out the application step at these temperatures can achieve an improved surface finish, without the risk of causing structural deformation to the part.

In exemplary embodiments, the heating step comprises heating the fluid to a temperature below the melting point of the material of the additively manufactured part.

Advantageously, heating the fluid to a temperature below the melting point of the material of the additively manufactured part can achieve an improved surface finish, without the risk of causing structural deformation to the part.

In exemplary embodiments, the heating step comprises heating the fluid to a temperature above the melting point of the solvent.

This has been found to be particular useful in embodiments where the fluid is a vapour.

In exemplary embodiments, the heating step comprises heating the fluid to a temperature close to the melting point of the material of the additively manufactured part.

Advantageously, it has been found that heating the fluid to temperatures close to the melting point of the material of the additively manufactured part can help to further improve the effectiveness of the process.

Furthermore, by heating the fluid to temperatures close to the melting point of the material of the additively manufactured part, it has also been found that chemical resistant materials (e.g. polypropylene) can be more easily processed to achieve an improved surface finish.

In exemplary embodiments, the application step comprises repeatedly applying the heated fluid to the surface of the additively manufactured part.

In exemplary embodiments, the method comprises a first phase and a second phase: wherein the first phase comprises providing a first fluid for processing the additively manufactured part in order to improve the surface finish of the additively manufactured part, wherein the first fluid comprises a first solvent, said solvent comprising an organic ester, a first heating step, wherein the first fluid is heated, and a first application step, wherein the first heated fluid is applied to a surface of the additively manufactured part; and wherein the second phase comprises providing a second fluid, different to the first fluid, for processing the additively manufactured part in order to improve the surface finish of the additively manufactured part, wherein the second fluid comprises a second solvent, different to the first solvent, selected from an organic ester, an aromatic organic compound or an acetal, a second heating step, wherein the second fluid is heated, and a second application step, wherein the second heated fluid is applied to a surface of the additively manufactured part.

In exemplary embodiments, the fluid is provided in the form of a liquid.

In exemplary embodiments, the application step comprises submerging the additively manufactured part in the liquid.

Advantageously, it has been found that providing the fluid as a liquid and submerging (i.e. completely covering) the additively manufactured part into the liquid can help to more effectively improve the surface finish of the part.

Furthermore, providing the fluid as a liquid and submerging the additively manufactured part into the liquid can help to achieve faster processing times for chemical resistant materials (such as Polypropylene).

In exemplary embodiments, the heating step comprises heating the fluid to a temperature up to a maximum of 5° C. below the melting point of the material of the additively manufactured part.

Advantageously, it has been found that heating the fluid to temperatures up to a maximum of 5° C. below the melting point of the material of the additively manufactured part can help to reduce the likelihood of the part becoming structurally deformed.

In exemplary embodiments, the heating step comprises heating the fluid to a temperature no less than 70° C. below the melting point of the material of the additively manufactured part.

Advantageously, it has been found that heating the fluid to a temperature no less than 70° C. below the melting point of the material of the additively manufactured is particularly effective for processing chemical resistant materials (e.g. polypropylene) when using fluids comprising an organic ester.

In exemplary embodiments, the heating step comprises heating the fluid to a temperature of at least 90° C.

In exemplary embodiments, the heating step comprises heating the fluid to a temperature of no more than 160° C.

In exemplary embodiments, the heating step comprises heating the fluid to a temperature in the range of 90° C. to 160° C.

Advantageously, it has been found that heating the fluid to a temperature in the range of 90° C. to 160° C. is particularly effective for processing chemical resistant materials (e.g. polypropylene), when using fluids comprising an organic ester solvent.

In exemplary embodiments, the organic ester is selected from one of Methyl Acetate, Ethyl Acetate, Benzyl Acetate and Amyl Acetate.

In exemplary embodiments, the organic ester is Methyl Acetate.

In exemplary embodiments, the organic ester is Ethyl Acetate.

In exemplary embodiments, the organic ester is Benzyl Acetate.

Advantageously, it has been found that Benzyl Acetate is an effective solvent for improving the surface finish of additively manufactured parts, particularly for chemical resistant materials (e.g. polypropylene).

Furthermore, Benzyl Acetate is a so called "green" material and hence its use can help to improve the surface finish of additively manufactured parts in an environmentally-friendly manner.

In exemplary embodiments, the heating step comprises heating the fluid to a temperature no less than 30° C. below the melting point of the material of the additively manufactured part.

Advantageously, it has been found that heating the fluid to a temperature no less than 30° C. below the melting point of the material of the additively manufactured is optimal for processing chemical resistant materials (e.g. polypropylene) when using fluids comprising Benzyl Acetate.

In exemplary embodiments, the heating step comprises heating the fluid to a temperature of at least 115° C.

In exemplary embodiments, the heating step comprises heating the fluid to a temperature of no more than 140° C.

In exemplary embodiments, the heating step comprises heating the fluid to a temperature in the range of 115° C. to 140° C.

Advantageously, it has been found that heating the fluid to a temperature in the range of 115° C. to 140° C. is optimal for processing chemical resistant materials (e.g. polypropylene), when using fluids comprising Benzyl Acetate.

In exemplary embodiments, the organic ester is Amyl Acetate.

In exemplary embodiments, the heating step comprises heating the fluid to a temperature no less than 30° C. below the melting point of the material of the additively manufactured part.

Advantageously, it has been found that heating the fluid to a temperature no less than 30° C. below the melting point of the material of the additively manufactured is optimal for processing chemical resistant materials (e.g. polypropylene) when using fluids comprising Amyl Acetate.

In exemplary embodiments, the heating step comprises heating the fluid to a temperature of at least 115° C.

In exemplary embodiments, the heating step comprises heating the fluid to a temperature of no more than 140° C.

In exemplary embodiments, the heating step comprises heating the fluid to a temperature in the range of 115° C. to 140° C.

Advantageously, it has been found that heating the fluid to a temperature in the range of 115° C. to 140° C. is optimal for processing chemical resistant materials (e.g. polypropylene), when using fluids comprising Amyl Acetate.

In exemplary embodiments, the application step is performed at atmospheric pressure.

Advantageously, the method of processing the additively manufactured part using a liquid does not require the application of pressure, and it is therefore possible to avoid the need for expensive pressure chambers and pumping systems. This help parts to be processed more economically.

In exemplary embodiments, the additively manufactured part is submerged in the liquid for at least 1 minute.

In exemplary embodiments, the additively manufactured part is submerged in the liquid for at least 2 minutes.

In exemplary embodiments, the additively manufactured part is submerged in the liquid for up to 2 hours.

In exemplary embodiments, the method comprises washing the additively manufactured part after the fluid has been applied onto the surface of the additively manufactured part.

In exemplary embodiments, the step of washing the additively manufactured part comprises rinsing (i.e. subjecting at least some of the part to a fluid flow) the part.

In exemplary embodiments, the step of rinsing the additively manufactured parts is performed with one of water, alcohol, acetone or another alcohol, solvent, acid, alkali or oil.

Advantageously, washing (i.e. applying a fluid to at least some of the part) helps to remove any unwanted solvent from the part after processing, which helps to avoid any unwanted removal of material from the part or other adverse effects which may be caused by over-exposure to the solvent.

In exemplary embodiments, the method further comprises drying the additively manufactured part after the fluid has been applied onto the surface of the additively manufactured part.

In exemplary embodiments, the drying step comprises placing the additively manufactured part into a processing chamber (i.e. an oven) and altering at least one of a temperature of the processing chamber, a pressure applied to the processing chamber and/or processing time during the drying process based on a surface crystallinity of the additively manufactured part.

It has been found manipulating the drying conditions based on the surface crystallinity of the part can help to improve the texture, gloss level and/or colour of the part.

It has also been found that this effect is particularly prevalent for polypropylene parts due to the specific molecular structure of polypropylene.

In exemplary embodiments, the drying step comprises heating the additively manufactured part to a temperature above a boiling point of the fluid.

Advantageously, drying the part helps to remove any unwanted solvent from the part after processing, which helps to avoid any unwanted removal of material from the part or other adverse effects which may be caused by over-exposure to the solvent.

In exemplary embodiments, the drying step comprises heating the additively manufactured part to a temperature in the range of 70° C. to 100° C.

In exemplary embodiments, the drying step comprises heating the additively manufactured part to a temperature in the range of 80° C. to 90° C.

In exemplary embodiments, the drying step comprises heating the additively manufactured part for approximately 30 minutes.

Advantageously, the aforementioned drying steps help to better stabilise the additively manufactured part after processing, which helps to prevent crystallisation of the surface of the part which can lead to discolouration.

In exemplary embodiments, the fluid is provided in the form of a gas (e.g. a vapour).

In exemplary embodiments, the heating step comprises heating the fluid to a temperature above a boiling point of the fluid such that the fluid is vaporised.

In exemplary embodiments, the application step comprises condensing the solvent vapour onto a surface of the additively manufactured part.

Advantageously, it has been found that providing the fluid as a vapour and condensing the fluid onto the part is an easily automatable method and can therefore help to reduce operator workload.

Furthermore, providing the fluid as a vapour can help the method to be performed in a safer and more practical working environment.

In addition, when used in combination with a drying process, it is possible for drying to be performed in the same processing chamber as that which is used for post-processing of the part, and hence processing efficiency can be further improved.

In exemplary embodiments, the solvent vapour is applied to a surface of the additively manufactured part for a period of time in the range of 1 hour to 6 hours.

In exemplary embodiments, the heating step comprises heating the fluid to a temperature up to a maximum of 5° C. below the melting point of the material of the additively manufactured part.

Advantageously, it has been found that heating the fluid to temperatures up to a maximum of 5° C. below the melting point of the material of the additively manufactured part can help to reduce the likelihood of the part becoming structurally deformed.

In exemplary embodiments, the heating step comprises heating the fluid to a temperature no less than 60° C. below the melting point of the material of the additively manufactured part.

Advantageously, it has been found that heating the fluid to a temperature no less than 60° C. below the melting point of the material of the additively manufactured is particularly effective for processing chemical resistant materials (e.g. polypropylene) when using fluids comprising an organic ester solvent in a vapour based method.

In exemplary embodiments, the heating step comprises heating the fluid to a temperature of at least 100° C.

In exemplary embodiments, the heating step comprises heating the fluid to a temperature of no more than 180° C.

In exemplary embodiments, the heating step comprises heating the fluid to a temperature in the range of 100° C. to 180° C.

Advantageously, it has been found that heating the fluid to a temperature in the range of 100° C. to 180° C. is particularly effective for processing chemical resistant materials (e.g. polypropylene), when using fluids comprising an organic ester solvent in a vapour based method.

In exemplary embodiments, the method further comprises, prior to the application step, a part heating step wherein the additively manufactured part is heated to a temperature below the melting point of the material of the additively manufactured part.

Advantageously, it has been found that heating the additively manufactured part prior to the application step helps improve the efficiency of the process.

In exemplary embodiments, the part heating step comprises heating the part to a temperature up to a maximum of 5° C. below the melting point of the material of the additively manufactured part.

In exemplary embodiments, the part heating step comprises heating the part to a temperature of no more than 130° C.

In exemplary embodiments, the method comprises placing the additively manufactured part into a processing chamber, and applying a negative pressure to the processing chamber.

Advantageously, by applying a negative pressure to the processing chamber, it is possible to vaporise the solvent at lower temperatures than would otherwise be obtainable. This can help to further reduce the likelihood of the part becoming structurally deformed due to temperature.

In exemplary embodiments, the processing chamber is maintained at a pressure less than 1 bar.

Advantageously, due to the thermodynamic performance of the solvent, it has been found that processing can be performed more effectively at pressures below 1 bar.

In exemplary embodiments, the processing chamber is maintained at a pressure in the range of 10 mbar to 1000 mbar.

Advantageously, due to the thermodynamic performance of the solvent, it has been found that processing can be performed even more effectively at pressures between 10 mbar and 1000 mbar.

In exemplary embodiments, the processing chamber is maintained at a pressure in the range of 10 mbar to 400 mbar.

Advantageously, due to the thermodynamic performance of the solvent, it has been found that processing can be performed most effectively at pressures between 10 mbar and 400 mbar.

In exemplary embodiments, the method comprises placing the additively manufactured part into the, or a, processing chamber, and the drying step comprises applying a negative pressure to the processing chamber.

Advantageously, by applying a negative pressure to the processing chamber, it is possible to vaporise the fluid at lower temperatures than would otherwise be obtainable. This can help to further reduce the likelihood of the part becoming structurally deformed due to temperature.

In exemplary embodiments, the drying step comprises heating the additively manufactured part to a temperature in the range of 70° C. to 100° C.

In exemplary embodiments, the drying step comprises heating the additively manufactured part to a temperature in the range of 80° C. to 90° C.

In exemplary embodiments, the drying step comprises heating the additively manufactured part for approximately 30 minutes.

Advantageously, the aforementioned drying steps help to better stabilise the additively manufactured part after processing, which helps to prevent crystallisation of the surface of the part which can lead to discolouration.

In exemplary embodiments, the method comprises cooling the additively manufactured part to a temperature in the range of −30° C. to 70° C.

Advantageously, cooling the additively manufactured part to such temperatures has been found to modify the surface crystallinity of the part.

A sixth aspect of the disclosure provides a part obtainable via the method according to the fifth aspect of the disclosure.

A seventh aspect of the disclosure provides a method for post-processing a powder-based additively manufactured part, the method comprising the steps of:
  providing a powder-based additively manufactured part, the additively manufactured part comprising a material having a melting point;
  providing a fluid for processing the additively manufactured part in order to improve the surface finish of the additively manufactured part, wherein the fluid comprises at least one aromatic organic compound;

a heating step, wherein the fluid is heated; and an application step, wherein the heated fluid is applied to a surface of the additively manufactured part.

Advantageously, it has been found that the steps of heating and applying fluids comprising at least aromatic organic compound to the surface of a powder-based additively manufactured part can help to improve the surface finish of the additively manufactured part, e.g. resulting in a less rough (i.e. smoother) surface finish.

In exemplary embodiments, the additively manufactured part comprises a multi-layer structure.

In exemplary embodiments, the additively manufactured part comprises a sintered material.

In exemplary embodiments, the fluid comprises a combination of solvents.

In exemplary embodiments, at least one of solvents of said combination of solvents is selected from a group of solvents other than aromatic organic compounds.

In exemplary embodiments, each solvent of said combination of solvents is selected from an organic ester, an aromatic organic compound or an acetal.

In exemplary embodiments, the fluid comprises more than one solvent selected from the following groups: organic esters; an aromatic organic compound; and acetals.

In exemplary embodiments, wherein the fluid comprises a plurality of fluids.

In exemplary embodiments, at least one of the fluids of said plurality of fluids is one of: a polar or non-polar solvent; an acid; an alkali; or an oil.

In exemplary embodiments, the oil is an essential oil, optionally nutmeg oil.

Advantageously, it has been found that combining the at least one solvent with an essential oil can help to further improve the surface finish of the additively manufactured part.

In exemplary embodiments, the fluid comprises limonene.

Advantageously, it has been found that the use of limonene with the at least one solvent can help to further improve the surface finish of the additively manufactured part.

In exemplary embodiments, the fluid comprises peanut oil.

Advantageously, it has been found that combining the at least one solvent with peanut oil can help to further improve the surface finish of the additively manufactured part.

In exemplary embodiments, the fluid comprises rapeseed oil.

Advantageously, it has been found that combining the at least one solvent with rapeseed oil can help to further improve the surface finish of the additively manufactured part.

In exemplary embodiments, at least one of the fluids may be a plasticizer.

Advantageously, plasticizers can be used to promote smoothing of the surface of the part and can also help to counter any unwanted effects of the solvents.

In exemplary embodiments, the plasticizer may be selected from one of the following groups: essential oils; acetals; aromatic organic compounds; acids; ethers and chlorocarbons.

In exemplary embodiments, at least one of the fluids may be 2-methoxypropanol or n,n-dimethylacetamide.

Advantageously, 2-methoxypropanol or n,n-dimethylacetamide help to reduce the flammability and volatility of the solvent mixture.

In exemplary embodiments, the step of providing an additively manufactured part comprises additively manufacturing a part using a powder-based additive manufacturing method.

In exemplary embodiments, the step of providing the powder-based additively manufactured part comprises sintering the powder-based additively manufactured part.

In exemplary embodiments, the powder-based additive manufacturing method is selective laser sintering.

In exemplary embodiments, the powder-based additive manufacturing method is multi-jet fusion.

In exemplary embodiments, the material of the additively manufactured part is a thermoplastic material.

In exemplary embodiments, the part is manufactured from a polymer.

In exemplary embodiments, the polymer comprises a polyalkylene.

In exemplary embodiments, the polyalkylene is selected from: polyethylene, polypropylene, polybutylene or polypentylene In exemplary embodiments, the polymer comprises at least 50 mol % alkylene monomer, more typically at least 75 mol % alkylene monomer, and even more typically at least 90 mol % alkylene monomer.

In exemplary embodiments, the part comprises at least 50 wt. % polypropylene, more typically at least 75 wt. % polypropylene, and even more typically at least 90 wt. % polypropylene"

In exemplary embodiments, the material of the additively manufactured part is selected from one of Polypropylene; Thermoplastic Polyurethane; Nylon, Polyamide Bioplastic; Thermoplastic Elastomer; Acrylonitrile butadiene styrene; Acrylonitrile styrene acrylate; Polycarbonate; Polyvinylidene fluoride; Polyphenylene Sulfide; Polybutylene terephthalate; Polyether Ether Ketone; Polyether Ketone Ketone; Ethylene Propylene Diene Monomer Rubber; Nitrile Rubber; Polymethyl Methacrylate; Polyethylene; Polyethylene Furanoate; Polylactic Acid; Thermoplastic Polyamide; Polyoxymethylene; Polyvinyl Chloride; Thermoplastic Copolyester; Polyether Block Amide, Polyetherimide, or co-polymers or polymers derived from at least one of the listed polymers.

In exemplary embodiments, the material of the additively manufactured part is Nylon 12, Nylon 11 or Nylon 6.

In exemplary embodiments, the material of the additively manufactured part is ULTEM™ 9085 and/or ULTEM™ 1010.

In exemplary embodiments, the material of the additively manufactured part is Polyether Ether Ketone (PEEK).

In exemplary embodiments, the material of the additively manufactured part Polyether Ketone Ketone (PEKK).

In exemplary embodiments, the material of the additively manufactured part is Thermoplastic Polyurethane.

In exemplary embodiments, the material of the additively manufactured part is a chemical-resistant material (e.g. polypropylene).

In exemplary embodiments, the material of the additively manufactured part has a degree of crystallinity below 60%.

In exemplary embodiments, the material of the additively manufactured part has a degree of crystallinity in the range of 15% to 60%.

In exemplary embodiments, the material of the additively manufactured part has a degree of crystallinity in the range of 15% to 30%.

In exemplary embodiments, the material of the additively manufactured part is polypropylene.

In exemplary embodiments, the polypropylene may be a filament-based Polypropylene.

In exemplary embodiments, the application step comprises applying the fluid to the surface of the additively manufactured part at a temperature suitable for overcoming the bonds between particles of the material at the surface of the powder-based additively manufactured part, wherein said temperature is below the melting point of the material of the additively manufactured part.

It has been discovered that carrying out the application step at these temperatures can achieve an improved surface finish, without the risk of causing structural deformation to the part.

In exemplary embodiments, the heating step comprises heating the fluid to a temperature below the melting point of the material of the additively manufactured part.

Advantageously, heating the fluid to a temperature below the melting point of the material of the additively manufactured part can achieve an improved surface finish, without the risk of causing structural deformation to the part.

In exemplary embodiments, the heating step comprises heating the fluid to a temperature above the melting point of the solvent.

This has been found to be particular useful in embodiments where the fluid is a vapour.

In exemplary embodiments, the heating step comprises heating the fluid to a temperature close to the melting point of the material of the additively manufactured part.

Advantageously, it has been found that heating the fluid to temperatures close to the melting point of the material of the additively manufactured part can help to further improve the effectiveness of the process.

Furthermore, by heating the fluid to temperatures close to the melting point of the material of the additively manufactured part, it has also been found that chemical resistant materials (e.g. polypropylene) can be more easily processed to achieve an improved surface finish.

In exemplary embodiments, the application step comprises repeatedly applying the heated fluid to the surface of the additively manufactured part.

In exemplary embodiments, the method comprises a first phase and a second phase: wherein the first phase comprises providing the additively manufactured part in order to improve the surface finish of the additively manufactured part, wherein the first fluid comprises a first solvent, said solvent comprising an aromatic organic compound, a first heating step, wherein the first fluid is heated, and a first application step, wherein the first heated fluid is applied to a surface of the additively manufactured part; and wherein the second phase comprises providing a second fluid, different to the first fluid, for processing the additively manufactured part in order to improve the surface finish of the additively manufactured part, wherein the second fluid comprises a second solvent, different to the first solvent, selected from an organic ester, an aromatic organic compound or an acetal, a second heating step, wherein the second fluid is heated, and a second application step, wherein the second heated fluid is applied to a surface of the additively manufactured part.

In exemplary embodiments, the fluid is provided in the form of a liquid.

In exemplary embodiments, the application step comprises submerging the additively manufactured part in the liquid.

Advantageously, it has been found that providing the fluid as a liquid and submerging (i.e. completely covering) the additively manufactured part into the liquid can help to more effectively improve the surface finish of the part.

Furthermore, providing the fluid as a liquid and submerging the additively manufactured part into the liquid can help to achieve faster processing times for chemical resistant materials (such as Polypropylene).

In exemplary embodiments, the heating step comprises heating the fluid to a temperature up to a maximum of 5° C. below the melting point of the material of the additively manufactured part.

Advantageously, it has been found that heating the fluid to temperatures up to a maximum of 5° C. below the melting point of the material of the additively manufactured part can help to reduce the likelihood of the part becoming structurally deformed.

In exemplary embodiments, the heating step comprises heating the fluid to a temperature no less than 70° C. below the melting point of the material of the additively manufactured part.

Advantageously, it has been found that heating the fluid to a temperature no less than 70° C. below the melting point of the material of the additively manufactured is particularly effective for processing chemical resistant materials (e.g. polypropylene) when using fluids comprising an aromatic organic compound.

In exemplary embodiments, the heating step comprises heating the fluid to a temperature of at least 90° C.

In exemplary embodiments, the heating step comprises heating the fluid to a temperature of no more than 160° C.

In exemplary embodiments, the heating step comprises heating the fluid to a temperature in the range of 90° C. to 160° C.

Advantageously, it has been found that heating the fluid to a temperature in the range of 90° C. to 160° C. is particularly effective for processing chemical resistant materials (e.g. polypropylene), when using fluids comprising an organic ester solvent.

In exemplary embodiments, the aromatic organic compound is selected from one of Benzophenone, Phenol, Benzene, cyclohexane, Dimethylbenzene, cyclohexanone and 1,2,4-trichlorobenzene.

In exemplary embodiments, the aromatic organic compound is phenol.

In exemplary embodiments, the aromatic organic compound is benzene.

In exemplary embodiments, the aromatic organic compound is cyclohexane.

In exemplary embodiments, the aromatic organic compound is 1,2,4-trichlorobenzene.

In exemplary embodiments, the heating step comprises heating the fluid to a temperature no less than 40° C. below the melting point of the material of the additively manufactured part.

Advantageously, it has been found that heating the fluid to a temperature no less than 40° C. below the melting point of the material of the additively manufactured is optimal for processing chemical resistant materials (e.g. polypropylene) when using fluids comprising 1,2,4-trichlorobenzene.

In exemplary embodiments, the heating step comprises heating the fluid to a temperature of at least 120° C.

In exemplary embodiments, the heating step comprises heating the fluid to a temperature of no more than 140° C.

In exemplary embodiments, the heating step comprises heating the fluid to a temperature in the range of 120° C. to 140° C.

Advantageously, it has been found that heating the fluid to a temperature in the range of 120° C. to 140° C. is optimal for processing chemical resistant materials (e.g. polypropylene), when using fluids comprising 1,2,4-trichlorobenzene.

In exemplary embodiments, the aromatic organic compound is Dimethylbenzene.

In exemplary embodiments, the heating step comprises heating the fluid to a temperature no less than 40° C. below the melting point of the material of the additively manufactured part.

Advantageously, it has been found that heating the fluid to a temperature no less than 40° C. below the melting point of the material of the additively manufactured is optimal for processing chemical resistant materials (e.g. polypropylene) when using fluids comprising Dimethylbenzene.

In exemplary embodiments, the heating step comprises heating the fluid to a temperature of at least 120° C.

In exemplary embodiments, the heating step comprises heating the fluid to a temperature of no more than 150° C.

In exemplary embodiments, the heating step comprises heating the fluid to a temperature in the range of 120° C. to 150° C.

Advantageously, it has been found that heating the fluid to a temperature in the range of 120° C. to 150° C. is optimal for processing chemical resistant materials (e.g. polypropylene), when using fluids comprising Dimethylbenzene.

In exemplary embodiments, the aromatic organic compound is an aromatic organic ketone.

In exemplary embodiments, the aromatic organic ketone has a formula RCOR', each R is independently selected from: an optionally substituted aryl or an optionally substituted heteroaryl, and each R' is independently selected from: an optionally substituted alkyl, an optionally substituted heteroalkyl, an optionally substituted aryl or an optionally substituted heteroaryl.

In exemplary embodiments, each R' is independently a $C_1$ to $C_{10}$ optionally substituted alkyl or a $C_1$ to $C_{10}$ optionally substituted heteroalkyl.

In exemplary embodiments, each R' is independently selected from: methyl, ethyl, propyl, butyl, pentyl and hexyl.

In exemplary embodiments, each R' is methyl.

In exemplary embodiments, each R' is independently selected from: an optionally substituted aryl or an optionally substituted heteroaryl.

In exemplary embodiments, the aromatic organic ketone is cyclohexanone.

In exemplary embodiments, the aromatic organic ketone is benzophenone.

In exemplary embodiments, the heating step comprises heating the fluid to a temperature no less than 30° C. below the melting point of the material of the additively manufactured part.

Advantageously, it has been found that heating the fluid to a temperature no less than 30° C. below the melting point of the material of the additively manufactured is optimal for processing chemical resistant materials (e.g. polypropylene) when using fluids comprising benzophenone.

In exemplary embodiments, the heating step comprises heating the fluid to a temperature of at least 115° C.

In exemplary embodiments, the heating step comprises heating the fluid to a temperature of no more than 135° C.

In exemplary embodiments, the heating step comprises heating the fluid to a temperature in the range of 115° C. to 135° C.

Advantageously, it has been found that heating the fluid to a temperature in the range of 115° C. to 135° C. is optimal for processing chemical resistant materials (e.g. polypropylene), when using fluids comprising benzophenone.

In exemplary embodiments, the application step is performed at atmospheric pressure.

Advantageously, the method of processing the additively manufactured part using a liquid does not require the application of pressure, and it is therefore possible to avoid the need for expensive pressure chambers and pumping systems. This help parts to be processed more economically.

In exemplary embodiments, the additively manufactured part is submerged in the liquid for at least 2 minutes.

In exemplary embodiments, the additively manufactured part is submerged in the liquid for up to 2 hours.

In exemplary embodiments, the method comprises washing the additively manufactured part after the fluid has been applied onto the surface of the additively manufactured part.

In exemplary embodiments, the step of washing the additively manufactured part comprises rinsing (i.e. subjecting at least some of the part to a fluid flow) the part.

In exemplary embodiments, the step of rinsing the additively manufactured parts is performed with one of water, alcohol, acetone or another alcohol, solvent, acid, alkali or oil.

Advantageously, washing (i.e. applying a fluid to at least some of the part) helps to remove any unwanted solvent from the part after processing, which helps to avoid any unwanted removal of material from the part or other adverse effects which may be caused by over-exposure to the solvent.

In exemplary embodiments, the method further comprises drying the additively manufactured part after the fluid has been applied onto the surface of the additively manufactured part.

In exemplary embodiments, the drying step comprises placing the additively manufactured part into a processing chamber (i.e. an oven) and altering at least one of a temperature of the processing chamber, a pressure applied to the processing chamber and/or processing time during the drying process based on a surface crystallinity of the additively manufactured part.

It has been found manipulating the drying conditions based on the surface crystallinity of the part can help to improve the texture, gloss level and/or colour of the part.

It has also been found that this effect is particularly prevalent for polypropylene parts due to the specific molecular structure of polypropylene.

In exemplary embodiments, the drying step comprises heating the additively manufactured part to a temperature above a boiling point of the fluid.

Advantageously, drying the part helps to remove any unwanted solvent from the part after processing, which helps to avoid any unwanted removal of material from the part or other adverse effects which may be caused by over-exposure to the solvent.

In exemplary embodiments, the drying step comprises heating the additively manufactured part to a temperature in the range of 70° C. to 100° C.

In exemplary embodiments, the drying step comprises heating the additively manufactured part to a temperature in the range of 80° C. to 90° C.

In exemplary embodiments, the drying step comprises heating the additively manufactured part for approximately 30 minutes.

Advantageously, the aforementioned drying steps help to better stabilise the additively manufactured part after processing, which helps to prevent crystallisation of the surface of the part which can lead to discolouration.

In exemplary embodiments, the fluid is provided in the form of a gas (e.g. a vapour).

In exemplary embodiments, the heating step comprises heating the fluid to a temperature above a boiling point of the fluid such that the fluid is vaporised.

In exemplary embodiments, the application step comprises condensing the solvent vapour onto a surface of the additively manufactured part.

Advantageously, it has been found that providing the fluid as a vapour and condensing the fluid onto the part is an easily automatable method and can therefore help to reduce operator workload.

Furthermore, providing the fluid as a vapour can help the method to be performed in a safer and more practical working environment.

In addition, when used in combination with a drying process, it is possible for drying to be performed in the same processing chamber as that which is used for post-processing of the part, and hence processing efficiency can be further improved.

In exemplary embodiments, the solvent vapour is applied to a surface of the additively manufactured part for a period of time in the range of 2 hours to 6 hours.

In exemplary embodiments, the heating step comprises heating the fluid to a temperature up to a maximum of 5° C. below the melting point of the material of the additively manufactured part.

Advantageously, it has been found that heating the fluid to temperatures up to a maximum of 5° C. below the melting point of the material of the additively manufactured part can help to reduce the likelihood of the part becoming structurally deformed.

In exemplary embodiments, the heating step comprises heating the fluid to a temperature up to a maximum of 10° C. below the melting point of the material of the additively manufactured part.

Advantageously, it has been found that heating the fluid to temperatures up to a maximum of 10° C. below the melting point of the material of the additively manufactured part can help to further reduce the likelihood of the part becoming structurally deformed, particularly when using a solvent vapour comprising Dimethylbenzene.

In exemplary embodiments, the heating step comprises heating the fluid to a temperature no less than 60° C. below the melting point of the material of the additively manufactured part.

Advantageously, it has been found that heating the fluid to a temperature no less than 60° C. below the melting point of the material of the additively manufactured is particularly effective for processing chemical resistant materials when using fluids comprising a 1, 2, 4 trichlorobenzene solvent in a vapour based method.

In exemplary embodiments, the heating step comprises heating the fluid to a temperature of at least 100° C.

In exemplary embodiments, the heating step comprises heating the fluid to a temperature of no more than 160° C.

In exemplary embodiments, the heating step comprises heating the fluid to a temperature in the range of 100° C. to 160° C.

Advantageously, it has been found that heating the fluid to a temperature in the range of 100° C. to 160° C. is particularly effective for processing chemical resistant materials when using fluids comprising a 1, 2, 4 trichlorobenzene solvent in a vapour based method.

In exemplary embodiments, the heating step comprises heating the fluid to a temperature of at least 60° C.

In exemplary embodiments, the heating step comprises heating the fluid to a temperature of no more than 150° C.

In exemplary embodiments, the heating step comprises heating the fluid to a temperature in the range of 60° C. to 150° C.

Advantageously, it has been found that heating the fluid to a temperature in the range of 60° C. to 150° C. is particularly effective for processing chemical resistant materials when using fluids comprising a Dimethylbenzene solvent in a vapour based method.

In exemplary embodiments, the heating step comprises heating the fluid to a temperature up to a maximum of 40° C. below the melting point of the material of the additively manufactured part.

Advantageously, it has been found that heating the fluid to temperatures up to a maximum of 40° C. below the melting point of the material of the additively manufactured part can help to even further reduce the likelihood of the part becoming structurally deformed, particularly when using a solvent vapour comprising Dimethylbenzene.

In exemplary embodiments, the heating step comprises heating the fluid to a temperature of no more than 120° C.

In exemplary embodiments, the heating step comprises heating the fluid to a temperature in the range of 60° C. to 120° C.

Advantageously, it has been found that heating the fluid to a temperature in the range of 60° C. to 120° C. is optimal for processing chemical resistant materials when using fluids comprising a Dimethylbenzene solvent in a vapour based method, without risking damage to the part.

In exemplary embodiments, the method further comprises, prior to the application step, a part heating step wherein the additively manufactured part is heated to a temperature below the melting point of the material of the additively manufactured part.

Advantageously, it has been found that heating the additively manufactured part prior to the application step helps improve the efficiency of the process.

In exemplary embodiments, the part heating step comprises heating the part to a temperature up to a maximum of 5° C. below the melting point of the material of the additively manufactured part.

In exemplary embodiments, the part heating step comprises heating the part to a temperature of no more than 130° C.

In exemplary embodiments, the method comprises placing the additively manufactured part into a processing chamber, and applying a negative pressure to the processing chamber.

Advantageously, by applying a negative pressure to the processing chamber, it is possible to vaporise the solvent at lower temperatures than would otherwise be obtainable. This can help to further reduce the likelihood of the part becoming structurally deformed due to temperature.

In exemplary embodiments, the processing chamber is maintained at a pressure less than 1 bar.

Advantageously, due to the thermodynamic performance of the solvent, it has been found that processing can be performed more effectively at pressures below 1 bar.

In exemplary embodiments, the processing chamber is maintained at a pressure in the range of 10 mbar to 1000 mbar.

Advantageously, due to the thermodynamic performance of the solvent, it has been found that processing can be performed more effectively at pressures between 10 mbar and 1000 mbar.

In exemplary embodiments, the processing chamber is maintained at a pressure in the range of 10 mbar to 400 mbar.

Advantageously, due to the thermodynamic performance of 1,2,4 trichlorobenzene solvents, it has been found that processing can be performed most effectively at pressures between 10 mbar and 400 mbar.

In exemplary embodiments, the processing chamber is maintained at a pressure in the range of 200 mbar to 600 mbar.

Advantageously, due to the thermodynamic performance of Dimethylbenzene solvents, it has been found that processing can be performed most effectively at pressures between 200 mbar and 600 mbar.

In exemplary embodiments, the method comprises placing the additively manufactured part into the, or a, processing chamber, and the drying step comprises applying a negative pressure to the processing chamber.

Advantageously, by applying a negative pressure to the processing chamber, it is possible to vaporise the fluid at lower temperatures than would otherwise be obtainable. This can help to further reduce the likelihood of the part becoming structurally deformed due to temperature.

In exemplary embodiments, the drying step comprises heating the additively manufactured part to a temperature in the range of 70° C. to 100° C.

In exemplary embodiments, the drying step comprises heating the additively manufactured part to a temperature in the range of 80° C. to 90° C.

In exemplary embodiments, the drying step comprises heating the additively manufactured part for approximately 30 minutes.

Advantageously, the aforementioned drying steps help to better stabilise the additively manufactured part after processing, which helps to prevent crystallisation of the surface of the part which can lead to discolouration.

In exemplary embodiments, the method comprises cooling the additively manufactured part to a temperature in the range of −30° C. to 70° C.

Advantageously, cooling the additively manufactured part to such temperatures has been found to modify the surface crystallinity of the part.

An eighth aspect of the disclosure provides a part obtainable via the method according to the seventh aspect of the disclosure.

A ninth aspect of the disclosure provides a method for post-processing a powder-based additively manufactured part, the method comprising the steps of:
  providing a powder-based additively manufactured part, the additively manufactured part comprising a material having a melting point, wherein said material comprises Thermoplastic Polyurethane;
  providing a fluid for processing the additively manufactured part in order to improve the surface finish of the additively manufactured part, wherein the fluid comprises at least one solvent comprising a ketone or an organosulfur compound;
  a heating step, wherein the fluid is heated; and
  an application step, wherein the heated fluid is applied to a surface of the additively manufactured part.

Advantageously, it has been found that the steps of heating and applying fluids comprising at least one ketone or organosulfur compound to the surface of a powder-based additively manufactured part can help to improve the surface finish of the additively manufactured part, e.g. resulting in a less rough (i.e. smoother) surface finish, particularly when processing Thermoplastic Polyurethane.

In exemplary embodiments, the additively manufactured part comprises a multi-layer structure.

In exemplary embodiments, the additively manufactured part comprises a sintered material.

In exemplary embodiments, the fluid comprises a combination of solvents.

In exemplary embodiments, at least one of solvents of said combination of solvents is selected from a group of solvents other than ketones and organosulfur compounds.

In exemplary embodiments, each solvent of said combination of solvents is selected from a ketone or an organosulfur compound.

In exemplary embodiments, the fluid comprises more than one solvent selected from the following groups: ketones; and organosulfur compounds.

In exemplary embodiments, wherein the fluid comprises a plurality of fluids.

In exemplary embodiments, at least one of the fluids of said plurality of fluids is one of: a polar or non-polar solvent; an acid; an alkali; or an oil.

In exemplary embodiments, the oil is an essential oil, optionally nutmeg oil.

Advantageously, it has been found that combining the at least one solvent with an essential oil can help to further improve the surface finish of the additively manufactured part.

In exemplary embodiments, the fluid comprises limonene.

Advantageously, it has been found that the use of limonene with the at least one solvent can help to further improve the surface finish of the additively manufactured part.

In exemplary embodiments, the fluid comprises peanut oil.

Advantageously, it has been found that combining the at least one solvent with peanut oil can help to further improve the surface finish of the additively manufactured part.

In exemplary embodiments, the fluid comprises rapeseed oil.

Advantageously, it has been found that combining the at least one solvent with rapeseed oil can help to further improve the surface finish of the additively manufactured part.

In exemplary embodiments, at least one of the fluids may be a plasticizer.

Advantageously, plasticizers can be used to promote smoothing of the surface of the part and can also help to counter any unwanted effects of the solvents.

In exemplary embodiments, the plasticizer may be selected from one of the following groups: essential oils; acetals; aromatic organic compounds; acids; ethers and chlorocarbons.

In exemplary embodiments, at least one of the fluids may be 2-methoxypropanol or n,n-dimethylacetamide.

Advantageously, 2-methoxypropanol or n,n-dimethylacetamide help to reduce the flammability and volatility of the solvent mixture.

In exemplary embodiments, the step of providing an additively manufactured part comprises additively manufacturing a part using a powder-based additive manufacturing method.

In exemplary embodiments, the step of providing the powder-based additively manufactured part comprises sintering the powder-based additively manufactured part.

In exemplary embodiments, the powder-based additive manufacturing method is selective laser sintering.

In exemplary embodiments, the powder-based additive manufacturing method is multi-jet fusion.

In exemplary embodiments, the application step comprises applying the fluid to the surface of the additively manufactured part at a temperature suitable for overcoming the bonds between particles of the material at the surface of the powder-based additively manufactured part, wherein said temperature is below the melting point of the material of the additively manufactured part.

It has been discovered that carrying out the application step at these temperatures can achieve an improved surface finish, without the risk of causing structural deformation to the part.

In exemplary embodiments, the heating step comprises heating the fluid to a temperature below the melting point of the material of the additively manufactured part.

Advantageously, heating the fluid to a temperature below the melting point of the material of the additively manufactured part can achieve an improved surface finish, without the risk of causing structural deformation to the part.

In exemplary embodiments, the heating step comprises heating the fluid to a temperature above the melting point of the solvent.

This has been found to be particular useful in embodiments where the fluid is a vapour.

In exemplary embodiments, the heating step comprises heating the fluid to a temperature close to the melting point of the material of the additively manufactured part.

Advantageously, it has been found that heating the fluid to temperatures close to the melting point of the material of the additively manufactured part can help to further improve the effectiveness of the process.

Furthermore, by heating the fluid to temperatures close to the melting point of the material of the additively manufactured part, it has also been found that chemical resistant materials (e.g. TPU) can be more easily processed to achieve an improved surface finish.

In exemplary embodiments, the application step comprises repeatedly applying the heated fluid to the surface of the additively manufactured part.

In exemplary embodiments, the method comprises a first phase and a second phase: wherein the first phase comprises providing a first fluid for processing the additively manufactured part in order to improve the surface finish of the additively manufactured part, wherein the first fluid comprises a first solvent, said solvent comprising an aromatic organic compound or an organosulfur compound, a first heating step, wherein the first fluid is heated, and a first application step, wherein the first heated fluid is applied to a surface of the additively manufactured part; and wherein the second phase comprises providing a second fluid, different to the first fluid, for processing the additively manufactured part in order to improve the surface finish of the additively manufactured part, wherein the second fluid comprises a second solvent, different to the first solvent, selected from an organic ester, an aromatic organic compound; an organosulfur compound or an acetal, a second heating step, wherein the second fluid is heated, and a second application step, wherein the second heated fluid is applied to a surface of the additively manufactured part.

In exemplary embodiments, the fluid is provided in the form of a liquid.

In exemplary embodiments, the application step comprises submerging the additively manufactured part in the liquid.

Advantageously, it has been found that providing the fluid as a liquid and submerging (i.e. completely covering) the additively manufactured part into the liquid can help to more effectively improve the surface finish of the part.

Furthermore, providing the fluid as a liquid and submerging the additively manufactured part into the liquid can help to achieve faster processing times for chemical resistant materials (such as TPU).

In exemplary embodiments, the heating step comprises heating the fluid to a temperature up to a maximum of 20° C. below the melting point of the material of the additively manufactured part.

Advantageously, it has been found that heating the fluid to temperatures up to a maximum of 20° C. below the melting point of the material of the additively manufactured part can help to reduce the likelihood of the part becoming structurally deformed.

In exemplary embodiments, the heating step comprises heating the fluid to a temperature no less than 160° C. below the melting point of the material of the additively manufactured part.

Advantageously, it has been found that heating the fluid to a temperature no less than 160° C. below the melting point of the material of the additively manufactured is particularly effective for processing chemical resistant materials (e.g. TPU) when using fluids comprising an aromatic organic compound or an organosulfur compound.

In exemplary embodiments, the heating step comprises heating the fluid to a temperature of at least 40° C.

In exemplary embodiments, the heating step comprises heating the fluid to a temperature of no more than 160° C.

In exemplary embodiments, the heating step comprises heating the fluid to a temperature in the range of 40° C. to 160° C.

Advantageously, it has been found that heating the fluid to a temperature in the range of 40° C. to 160° C. is particularly effective for processing chemical resistant materials (e.g. TPU), when using fluids comprising an aromatic organic compound or an organosulfur compound.

In exemplary embodiments, the ketone has a formula RCOR', each R is independently selected from: an optionally substituted alkyl, an optionally substituted heteroalky, an optionally substituted aryl or an optionally substituted heteroaryl, and each R' is independently selected from: an optionally substituted alkyl, an optionally substituted heteroalkyl, an optionally substituted aryl or an optionally substituted heteroaryl.

In exemplary embodiments, each R is independently selected from: a $C_1$ to $C_{10}$ optionally substituted alkyl or a $C_1$ to $C_{10}$ optionally substituted heteroalkyl.

In exemplary embodiments, each R is independently selected from: methyl, ethyl, propyl and butyl.

In exemplary embodiments, each R' is independently a $C_1$ to $C_{10}$ optionally substituted alkyl or a $C_1$ to $C_{10}$ optionally substituted heteroalkyl.

In exemplary embodiments, each R' is independently selected from: methyl, ethyl, propyl, butyl, pentyl and hexyl.

In exemplary embodiments, the ketone is an aromatic organic ketone.

In exemplary embodiments, the ketone has a formula RCOR', each R is independently selected from: an optionally substituted aryl or an optionally substituted heteroaryl, and each R' is independently selected from: an optionally substituted alkyl, an optionally substituted heteroalkyl, an optionally substituted aryl or an optionally substituted heteroaryl.

In exemplary embodiments, each R' is independently a $C_1$ to $C_{10}$ optionally substituted alkyl or a $C_1$ to $C_{10}$ optionally substituted heteroalkyl.

In exemplary embodiments, each R' is independently selected from: methyl, ethyl, propyl, butyl, pentyl and hexyl.

In exemplary embodiments, each R' is methyl.

In exemplary embodiments, each R' is independently selected from: an optionally substituted aryl or an optionally substituted heteroaryl.

In exemplary embodiments, the ketone is selected from one of Acetophenone, Benzophenone, cyclohexanone and Dihydrolevoglucosenone.

In exemplary embodiments, the ketone is benzophenone.

In exemplary embodiments, the ketone is cyclohexanone.

In exemplary embodiments, the ketone is acetophenone.

Advantageously, Acetophenone is a so called "green" material and hence its use can help to improve the surface finish of additively manufactured parts in an environmentally-friendly manner.

Furthermore, it has been found that Acetophenone is particularly effective at improving the surface finish of additively manufactured parts, particularly for chemical resistant materials (e.g. polypropylene).

In exemplary embodiments, the heating step comprises heating the fluid to a temperature no less than 110° C. below the melting point of the material of the additively manufactured part.

Advantageously, it has been found that heating the fluid to a temperature no less than 110° C. below the melting point of the material of the additively manufactured is optimal for processing chemical resistant materials (e.g. TPU) when using fluids comprising acetophenone.

In exemplary embodiments, the heating step comprises heating the fluid to a temperature of at least 90° C.

In exemplary embodiments, the heating step comprises heating the fluid to a temperature of no more than 160° C.

In exemplary embodiments, the heating step comprises heating the fluid to a temperature in the range of 90° C. to 160° C.

Advantageously, it has been found that heating the fluid to a temperature in the range of 90° C. to 160° C. is optimal for processing chemical resistant materials (e.g. TPU), when using fluids comprising acetophenone.

In exemplary embodiments, the ketone is Dihydrolevoglucosenone.

In exemplary embodiments, the heating step comprises heating the fluid to a temperature up to a maximum of 90° C. below the melting point of the material of the additively manufactured part.

Advantageously, it has been found that heating the fluid to temperatures up to a maximum of 90° C. below the melting point of the material of the additively manufactured part can help to reduce the likelihood of the part becoming structurally deformed when using fluids comprising Dihydrolevoglucosenone.

In exemplary embodiments, the heating step comprises heating the fluid to a temperature no less than 140° C. below the melting point of the material of the additively manufactured part.

Advantageously, it has been found that heating the fluid to a temperature no less than 140° C. below the melting point of the material of the additively manufactured is optimal for processing chemical resistant materials (e.g. TPU) when using fluids comprising Dihydrolevoglucosenone.

In exemplary embodiments, the heating step comprises heating the fluid to a temperature of at least 60° C.

In exemplary embodiments, the heating step comprises heating the fluid to a temperature of no more than 90° C.

In exemplary embodiments, the heating step comprises heating the fluid to a temperature in the range of 60° C. to 90° C.

Advantageously, it has been found that heating the fluid to a temperature in the range of 60° C. to 90° C. is optimal for processing chemical resistant materials (e.g. TPU), when using fluids comprising Dihydrolevoglucosenone.

In exemplary embodiments, the organosulfur compound is Dimethyl sulfoxide (DMSO).

In exemplary embodiments, the heating step comprises heating the fluid to a temperature up to a maximum of 105° C. below the melting point of the material of the additively manufactured part.

Advantageously, it has been found that heating the fluid to temperatures up to a maximum of 105° C. below the melting point of the material of the additively manufactured part can help to reduce the likelihood of the part becoming structurally deformed when using fluids comprising DMSO.

In exemplary embodiments, the heating step comprises heating the fluid to a temperature no less than 150° C. below the melting point of the material of the additively manufactured part.

Advantageously, it has been found that heating the fluid to a temperature no less than 150° C. below the melting point of the material of the additively manufactured is optimal for processing chemical resistant materials (e.g. TPU) when using fluids comprising DMSO.

In exemplary embodiments, the heating step comprises heating the fluid to a temperature of at least 50° C.

In exemplary embodiments, the heating step comprises heating the fluid to a temperature of no more than 75° C.

In exemplary embodiments, the heating step comprises heating the fluid to a temperature in the range of 50° C. to 75° C.

Advantageously, it has been found that heating the fluid to a temperature in the range of 50° C. to 75° C. is optimal for processing chemical resistant materials (e.g. TPU), when using fluids comprising DMSO.

In exemplary embodiments, the application step is performed at atmospheric pressure.

Advantageously, the method of processing the additively manufactured part using a liquid does not require the application of pressure, and it is therefore possible to avoid the need for expensive pressure chambers and pumping systems. This help parts to be processed more economically.

In exemplary embodiments, the additively manufactured part is submerged in the liquid for at least 30 seconds.

In exemplary embodiments, the additively manufactured part is submerged in the liquid for up to 2 hours.

In exemplary embodiments, the method comprises washing the additively manufactured part after the fluid has been applied onto the surface of the additively manufactured part.

In exemplary embodiments, the step of washing the additively manufactured part comprises rinsing (i.e. subjecting at least some of the part to a fluid flow) the part.

In exemplary embodiments, the step of rinsing the additively manufactured parts is performed with one of water, alcohol, acetone or another alcohol, solvent, acid, alkali or oil.

Advantageously, washing (i.e. applying a fluid to at least some of the part) helps to remove any unwanted solvent from the part after processing, which helps to avoid any unwanted removal of material from the part or other adverse effects which may be caused by over-exposure to the solvent.

In exemplary embodiments, the method further comprises drying the additively manufactured part after the fluid has been applied onto the surface of the additively manufactured part.

In exemplary embodiments, the drying step comprises placing the additively manufactured part into a processing chamber (i.e. an oven) and altering at least one of a temperature of the processing chamber, a pressure applied to the processing chamber and/or processing time during the drying process based on a surface crystallinity of the additively manufactured part.

It has been found manipulating the drying conditions based on the surface crystallinity of the part can help to improve the texture, gloss level and/or colour of the part.

It has also been found that this effect is particularly prevalent for polypropylene parts due to the specific molecular structure of polypropylene.

In exemplary embodiments, the drying step comprises heating the additively manufactured part to a temperature above a boiling point of the fluid.

Advantageously, drying the part helps to remove any unwanted solvent from the part after processing, which helps to avoid any unwanted removal of material from the part or other adverse effects which may be caused by over-exposure to the solvent.

In exemplary embodiments, the drying step comprises heating the additively manufactured part to a temperature in the range of 70° C. to 100° C.

In exemplary embodiments, the drying step comprises heating the additively manufactured part to a temperature in the range of 80° C. to 90° C.

In exemplary embodiments, the drying step comprises heating the additively manufactured part for approximately 30 minutes.

Advantageously, the aforementioned drying steps help to better stabilise the additively manufactured part after processing, which helps to prevent crystallisation of the surface of the part which can lead to discolouration.

In exemplary embodiments, the fluid is provided in the form of a gas (e.g. a vapour).

In exemplary embodiments, the heating step comprises heating the fluid to a temperature above a boiling point of the fluid such that the fluid is vaporised.

In exemplary embodiments, the application step comprises condensing the solvent vapour onto a surface of the additively manufactured part.

Advantageously, it has been found that providing the fluid as a vapour and condensing the fluid onto the part is an easily automatable method and can therefore help to reduce operator workload.

Furthermore, providing the fluid as a vapour can help the method to be performed in a safer and more practical working environment.

In addition, when used in combination with a drying process, it is possible for drying to be performed in the same processing chamber as that which is used for post-processing of the part, and hence processing efficiency can be further improved.

In exemplary embodiments, the solvent vapour is applied to a surface of the additively manufactured part for a period of time in the range of 1 hour to 6 hours.

In exemplary embodiments, the heating step comprises heating the fluid to a temperature up to a maximum of 5° C. below the melting point of the material of the additively manufactured part.

Advantageously, it has been found that heating the fluid to temperatures up to a maximum of 5° C. below the melting point of the material of the additively manufactured part can help to reduce the likelihood of the part becoming structurally deformed.

In exemplary embodiments, the heating step comprises heating the fluid to a temperature no less than 80° C. below the melting point of the material of the additively manufactured part.

Advantageously, it has been found that heating the fluid to a temperature no less than 80° C. below the melting point of the material of the additively manufactured is particularly effective for processing chemical resistant materials (e.g. TPU) when using fluids comprising an aromatic organic compound or an organosulfur compound in a vapour based method.

In exemplary embodiments, the heating step comprises heating the fluid to a temperature of at least 120° C.

In exemplary embodiments, the heating step comprises heating the fluid to a temperature of no more than 180° C.

In exemplary embodiments, the heating step comprises heating the fluid to a temperature in the range of 120° C. to 180° C.

Advantageously, it has been found that heating the fluid to a temperature in the range of 120° C. to 180° C. is particularly effective for processing chemical resistant materials (e.g. TPU), when using fluids comprising an aromatic organic compound or an organosulfur compound in a vapour based method.

In exemplary embodiments, the method further comprises, prior to the application step, a part heating step wherein the additively manufactured part is heated to a temperature below the melting point of the material of the additively manufactured part.

Advantageously, it has been found that heating the additively manufactured part prior to the application step helps improve the efficiency of the process.

In exemplary embodiments, the part heating step comprises heating the part to a temperature up to a maximum of 110° C. below the melting point of the material of the additively manufactured part.

In exemplary embodiments, the part heating step comprises heating the part to a temperature of no more than 70° C.

In exemplary embodiments, the method comprises placing the additively manufactured part into a processing chamber, and applying a negative pressure to the processing chamber.

Advantageously, by applying a negative pressure to the processing chamber, it is possible to vaporise the solvent at lower temperatures than would otherwise be obtainable. This can help to further reduce the likelihood of the part becoming structurally deformed due to temperature.

In exemplary embodiments, the processing chamber is maintained at a pressure less than 1 bar.

Advantageously, due to the thermodynamic performance of the solvent, it has been found that processing can be performed more effectively at pressures below 1 bar.

In exemplary embodiments, the processing chamber is maintained at a pressure in the range of 10 mbar to 1000 mbar.

Advantageously, due to the thermodynamic performance of the solvent, it has been found that processing can be performed even more effectively at pressures between 10 mbar and 1000 mbar.

In exemplary embodiments, the processing chamber is maintained at a pressure in the range of 10 mbar to 200 mbar.

Advantageously, due to the thermodynamic performance of the solvent, it has been found that processing can be performed most effectively at pressures between 10 mbar and 200 mbar.

In exemplary embodiments, the method comprises placing the additively manufactured part into the, or a, processing chamber, and the drying step comprises applying a negative pressure to the processing chamber.

Advantageously, by applying a negative pressure to the processing chamber, it is possible to vaporise the fluid at lower temperatures than would otherwise be obtainable. This can help to further reduce the likelihood of the part becoming structurally deformed due to temperature.

In exemplary embodiments, the drying step comprises heating the additively manufactured part to a temperature in the range of 70° C. to 100° C.

In exemplary embodiments, the drying step comprises heating the additively manufactured part to a temperature in the range of 80° C. to 90° C.

In exemplary embodiments, the drying step comprises heating the additively manufactured part for approximately 30 minutes.

Advantageously, the aforementioned drying steps help to better stabilise the additively manufactured part after processing, which helps to prevent crystallisation of the surface of the part which can lead to discolouration.

In exemplary embodiments, the method comprises cooling the additively manufactured part to a temperature in the range of −30° C. to 70° C.

Advantageously, cooling the additively manufactured part to such temperatures has been found to modify the surface crystallinity of the part.

A tenth aspect of the disclosure provides a part obtainable via the method according to the ninth aspect of the disclosure.

An eleventh aspect of the disclosure provides a method for post-processing a powder-based additively manufactured part, the method comprising the steps of:
providing a powder-based additively manufactured part, the additively manufactured part comprising a material having a melting point, wherein the material comprises a Polyaryletherketone;
providing a fluid for processing the additively manufactured part in order to improve the surface finish of the additively manufactured part, wherein the fluid comprises at least one acid;
a heating step, wherein the fluid is heated; and
an application step, wherein the heated fluid is applied to a surface of the additively manufactured part.

Advantageously, it has been found that the steps of heating and applying fluids comprising at least one solvent comprising an organic acid or an inorganic acid to the surface of a powder-based additively manufactured part can help to improve the surface finish of the additively manufactured part, e.g. resulting in a less rough (i.e. smoother) surface finish.

Furthermore, it has also been found that this method is particularly effective at smoothing chemical resistant materials, such as PEKK or PEEK.

In exemplary embodiments, the material of the additively manufactured part comprises Polyether Ether Ketone (PEEK) or Polyether Ketone Ketone (PEKK).

In exemplary embodiments, the material of the additively manufactured part is Polyether Ether Ketone (PEEK).

In exemplary embodiments, the material of the additively manufactured part Polyether Ketone Ketone (PEKK).

In exemplary embodiments, the acid is an organic acid.

In exemplary embodiments, the organic acid is dicholoracetic acid.

In exemplary embodiments, the acid is an inorganic acid.

In exemplary embodiments, the inorganic acid is Sulfuric acid.

In exemplary embodiments, the additively manufactured part comprises a multi-layer structure.

In exemplary embodiments, the additively manufactured part comprises a sintered material.

In exemplary embodiments, the fluid comprises a combination of solvents.

In exemplary embodiments, at least one of the solvents of said combination of solvents is not an acid.

In exemplary embodiments, the fluid comprises more than one acid.

In exemplary embodiments, each one of the solvents of said combination of solvents is an acid.

In exemplary embodiments, wherein the fluid comprises a plurality of fluids.

In exemplary embodiments, at least one of the fluids of said plurality of fluids is one of: a polar or non-polar solvent; an acid; an alkali; or an oil.

In exemplary embodiments, the oil is an essential oil, optionally nutmeg oil.

Advantageously, it has been found that combining the at least one solvent with an essential oil can help to further improve the surface finish of the additively manufactured part.

In exemplary embodiments, the fluid comprises limonene.

Advantageously, it has been found that the use of limonene with the at least one solvent can help to further improve the surface finish of the additively manufactured part.

In exemplary embodiments, the fluid comprises peanut oil.

Advantageously, it has been found that combining the at least one solvent with peanut oil can help to further improve the surface finish of the additively manufactured part.

In exemplary embodiments, the fluid comprises rapeseed oil.

Advantageously, it has been found that combining the at least one solvent with rapeseed oil can help to further improve the surface finish of the additively manufactured part.

In exemplary embodiments, at least one of the fluids may be a plasticizer.

Advantageously, plasticizers can be used to promote smoothing of the surface of the part and can also help to counter any unwanted effects of the solvents.

In exemplary embodiments, the plasticizer may be selected from one of the following groups: essential oils; acetals; aromatic organic compounds; acids; ethers and chlorocarbons.

In exemplary embodiments, at least one of the fluids may be 2-methoxypropanol or n,n-dimethylacetamide.

Advantageously, 2-methoxypropanol or n,n-dimethylacetamide help to reduce the flammability and volatility of the solvent mixture.

In exemplary embodiments, the step of providing an additively manufactured part comprises additively manufacturing a part using a powder-based additive manufacturing method.

In exemplary embodiments, the step of providing the powder-based additively manufactured part comprises sintering the powder-based additively manufactured part.

In exemplary embodiments, the powder-based additive manufacturing method is selective laser sintering.

In exemplary embodiments, the powder-based additive manufacturing method is multi-jet fusion.

In exemplary embodiments, the application step comprises applying the fluid to the surface of the additively manufactured part at a temperature suitable for overcoming the bonds between particles of the material at the surface of the powder-based additively manufactured part, wherein said temperature is below the melting point of the material of the additively manufactured part.

It has been discovered that carrying out the application step at these temperatures can achieve an improved surface finish, without the risk of causing structural deformation to the part.

In exemplary embodiments, the heating step comprises heating the fluid to a temperature below the melting point of the material of the additively manufactured part.

Advantageously, heating the fluid to a temperature below the melting point of the material of the additively manufactured part can achieve an improved surface finish, without the risk of causing structural deformation to the part.

In exemplary embodiments, the heating step comprises heating the fluid to a temperature above the melting point of the solvent.

This has been found to be particular useful in embodiments where the fluid is a vapour.

In exemplary embodiments, the heating step comprises heating the fluid to a temperature close to the melting point of the material of the additively manufactured part.

Advantageously, it has been found that heating the fluid to temperatures close to the melting point of the material of the additively manufactured part can help to further improve the effectiveness of the process.

Furthermore, by heating the fluid to temperatures close to the melting point of the material of the additively manufactured part, it has also been found that chemical resistant materials (e.g. PEEK/PEKK) can be more easily processed to achieve an improved surface finish.

In exemplary embodiments, the application step comprises repeatedly applying the heated fluid to the surface of the additively manufactured part.

In exemplary embodiments, the method comprises a first phase and a second phase: wherein the first phase comprises providing a first fluid for processing the additively manufactured part in order to improve the surface finish of the additively manufactured part, wherein the first fluid comprises a acid, a first heating step, wherein the first fluid is heated, and a first application step, wherein the first heated fluid is applied to a surface of the additively manufactured part; and wherein the second phase comprises providing a second fluid, different to the first fluid, for processing the additively manufactured part in order to improve the surface finish of the additively manufactured part, wherein the second fluid comprises a second solvent, different to the first solvent, selected from an organic acid, Sulfolane, Chloroform, an inorganic acid and N-Methyl-2-pyrrolidone (NMP), a second heating step, wherein the second fluid is heated, and a second application step, wherein the second heated fluid is applied to a surface of the additively manufactured part.

In exemplary embodiments, the fluid is provided in the form of a liquid.

In exemplary embodiments, the application step comprises submerging the additively manufactured part in the liquid.

Advantageously, it has been found that providing the fluid as a liquid and submerging (i.e. completely covering) the additively manufactured part into the liquid can help to more effectively improve the surface finish of the part.

Furthermore, providing the fluid as a liquid and submerging the additively manufactured part into the liquid can help to achieve faster processing times for chemical resistant materials (such as PEEK/PEKK).

In exemplary embodiments, the heating step comprises heating the fluid to a temperature up to a maximum of 5° C. below the melting point of the material of the additively manufactured part.

Advantageously, it has been found that heating the fluid to temperatures up to a maximum of 5° C. below the melting point of the material of the additively manufactured part can help to reduce the likelihood of the part becoming structurally deformed.

In exemplary embodiments, the heating step comprises heating the fluid to a temperature no less than 253° C. below the melting point of the material of the additively manufactured part.

Advantageously, it has been found that heating the fluid to a temperature no less than 253° C. below the melting point of the material of the additively manufactured is particularly effective for processing chemical resistant materials (e.g. PEEK/PEKK).

In exemplary embodiments, the heating step comprises heating the fluid to a temperature of at least 90° C.

In exemplary embodiments, the heating step comprises heating the fluid to a temperature of no more than 190° C.

In exemplary embodiments, the heating step comprises heating the fluid to a temperature in the range of 90° C. to 190° C.

Advantageously, it has been found that heating the fluid to a temperature in the range of 90° C. to 190° C. is particularly effective for processing chemical resistant materials (e.g. PEEK/PEKK).

In exemplary embodiments, the heating step comprises heating the fluid to a temperature no less than 233° C. below the melting point of the material of the additively manufactured part.

Advantageously, it has been found that heating the fluid to a temperature no less than 233° C. below the melting point of the material of the additively manufactured is optimal for processing chemical resistant materials (e.g. PEEK/PEKK) without causing damage to the part.

In exemplary embodiments, the heating step comprises heating the fluid to a temperature of at least 110° C.

In exemplary embodiments, the heating step comprises heating the fluid to a temperature of no more than 120° C.

In exemplary embodiments, the heating step comprises heating the fluid to a temperature in the range of 110° C. to 120° C.

Advantageously, it has been found that heating the fluid to a temperature in the range of 110° C. to 120° C. is optimal for processing chemical resistant materials (e.g. PEEK or PEKK), without causing damage to the part.

In exemplary embodiments, the solvent is dichloroacetic acid.

In exemplary embodiments, the solvent is sulfuric acid.

In exemplary embodiments, the additively manufactured part is submerged in the liquid for at least 2 minutes.

In exemplary embodiments, the additively manufactured part is submerged in the liquid for up to 2 hours.

In exemplary embodiments, the method comprises washing the additively manufactured part after the fluid has been applied onto the surface of the additively manufactured part.

In exemplary embodiments, the step of washing the additively manufactured part comprises rinsing (i.e. subjecting at least some of the part to a fluid flow) the part.

In exemplary embodiments, the step of rinsing the additively manufactured parts is performed with one of water, alcohol, acetone or another alcohol, solvent, acid, alkali or oil.

Advantageously, washing (i.e. applying a fluid to at least some of the part) helps to remove any unwanted solvent from the part after processing, which helps to avoid any unwanted removal of material from the part or other adverse effects which may be caused by over-exposure to the solvent.

In exemplary embodiments, the method further comprises drying the additively manufactured part after the fluid has been applied onto the surface of the additively manufactured part.

In exemplary embodiments, the drying step comprises placing the additively manufactured part into a processing chamber (i.e. an oven) and altering at least one of a temperature of the processing chamber, a pressure applied to the processing chamber and/or processing time during the drying process based on a surface crystallinity of the additively manufactured part.

It has been found manipulating the drying conditions based on the surface crystallinity of the part can help to improve the texture, gloss level and/or colour of the part.

It has also been found that this effect is particularly prevalent for polypropylene parts due to the specific molecular structure of polypropylene.

In exemplary embodiments, the drying step comprises heating the additively manufactured part to a temperature above a boiling point of the fluid.

Advantageously, drying the part helps to remove any unwanted solvent from the part after processing, which helps to avoid any unwanted removal of material from the part or other adverse effects which may be caused by over-exposure to the solvent.

In exemplary embodiments, the drying step comprises heating the additively manufactured part to a temperature in the range of 70° C. to 100° C.

In exemplary embodiments, the drying step comprises heating the additively manufactured part to a temperature in the range of 80° C. to 90° C.

In exemplary embodiments, the drying step comprises heating the additively manufactured part for approximately 30 minutes.

Advantageously, the aforementioned drying steps help to better stabilise the additively manufactured part after processing, which helps to prevent crystallisation of the surface of the part which can lead to discolouration.

A twelfth aspect of the disclosure provides a part obtainable via the method according to the eleventh aspect of the disclosure.

A thirteenth aspect of the disclosure provides an apparatus for post-processing a powder-based additively manufactured part comprising a reservoir configured for storing a fluid for processing an additively manufactured part, a heating element for heating the fluid, and a controller configured to control the heating element so as to heat the fluid.

Advantageously, this apparatus can be used to help to improve the surface finish of an additively manufactured part.

In exemplary embodiments, the reservoir is a solvent bath configured for receiving the additively manufactured part therein.

In exemplary embodiments, the reservoir is a solvent bath configured for receiving the entirety of the additively manufactured part therein.

Advantageously, providing a solvent bath configured to receive the entirety of the additively manufactured part therein allows the part to be submerged, which can help to more effectively improve the surface finish of the additively manufactured part.

In exemplary embodiments, the heating element is located at or proximal to the reservoir.

Advantageously, providing the heating element at or proximal to the reservoir helps to more efficiently maintain the reservoir at the required temperature, and therefore processing efficiency can be improved.

In exemplary embodiments, the apparatus further comprises a gas-tight processing chamber and a solvent distribution system configured to deliver a fluid vapour from the reservoir into the processing chamber.

Advantageously, it has been found that providing a gas-tight processing chamber and solvent distribution system enables vapours to be used for processing, which in turn makes the apparatus (and associated method) more easily automatable.

In exemplary embodiments, the apparatus further comprises a vacuum pump configured to apply a negative pressure to an interior of the processing chamber.

Advantageously, the provision of a vacuum pump configured to apply a negative pressure to the processing chamber helps the fluid to vaporise at lower temperatures than would otherwise be obtainable. This helps to further reduce the likelihood of the part becoming structurally deformed due to temperature during the process.

In exemplary embodiments, the heating element is located at or proximal to the processing chamber.

Advantageously, providing a heating element located at or proximal to the processing chamber helps to keep the surfaces of the processing chamber above the condensation temperature of the vapour, thereby helping to prevent vapour from condensing on the wall of the chamber, which in turn helps to improve processing efficiency.

In exemplary embodiments, the heating element comprises at least part of a wall of the processing chamber.

Advantageously, providing a heating element which comprises at least part of a wall of the processing chamber helps to further prevent vapour from condensing on the wall of the chamber, which in turn helps to further improve processing efficiency.

In exemplary embodiments, the controller is configured to control the apparatus in accordance with the method of the first aspect of the disclosure.

A fourteenth aspect of the disclosure provides an additive manufacturing system comprising a powder-based additive manufacturing apparatus and the apparatus according to the thirteenth aspect of the disclosure.

In exemplary embodiments, the powder-based additive manufacturing apparatus is a selective laser sintering apparatus.

In exemplary embodiments, the powder-based additive manufacturing apparatus is a multi-jet fusion apparatus.

We consider the term "chemical resistant material" to be defined as a material capable of maintaining its original (as manufactured) properties and structural integrity after exposure to an organic solvent.

We consider the term "organic solvent" to be defined as solvents including the groups of aliphatic hydrocarbons, cyclic hydrocarbons, aromatic hydrocarbons, halogenated hydrocarbons, ketones, amines, esters, alcohols, aldehydes and ethers.

We consider the term "heating" to be defined as increasing a temperature significantly above (e.g. by more than 5° C. to 10° C.) an ambient (e.g. room) temperature.

We consider the term "a temperature close to the melting point" to be defined as a temperature sufficient to overcome the bonds between particles of the material at the surface of the additively manufactured part, but below the melting point of the material of the additively manufactured.

We consider the term "washing" to be defined as the application a fluid to at least some of the part.

We consider the term "rinsing" to be defined as the application of a fluid flow to at least some of a part.

We consider the term "essential oil" to be defined as a naturally-occurring compound (e.g. a compound that can be extracted from a plant or tree).

We consider the term "fluid" to encompass both liquids and gases.

We consider the term "post-processing" to be defined as processing an additively manufactured part after the part has been built for the purposes of changing at least one physical property (e.g. surface roughness) of the additively manufactured part.

BRIEF DESCRIPTION OF THE DRAWINGS

Embodiments will now be described with reference to the accompanying drawings, in which.

DETAILED DESCRIPTION OF EMBODIMENT(S)

Figure 1:
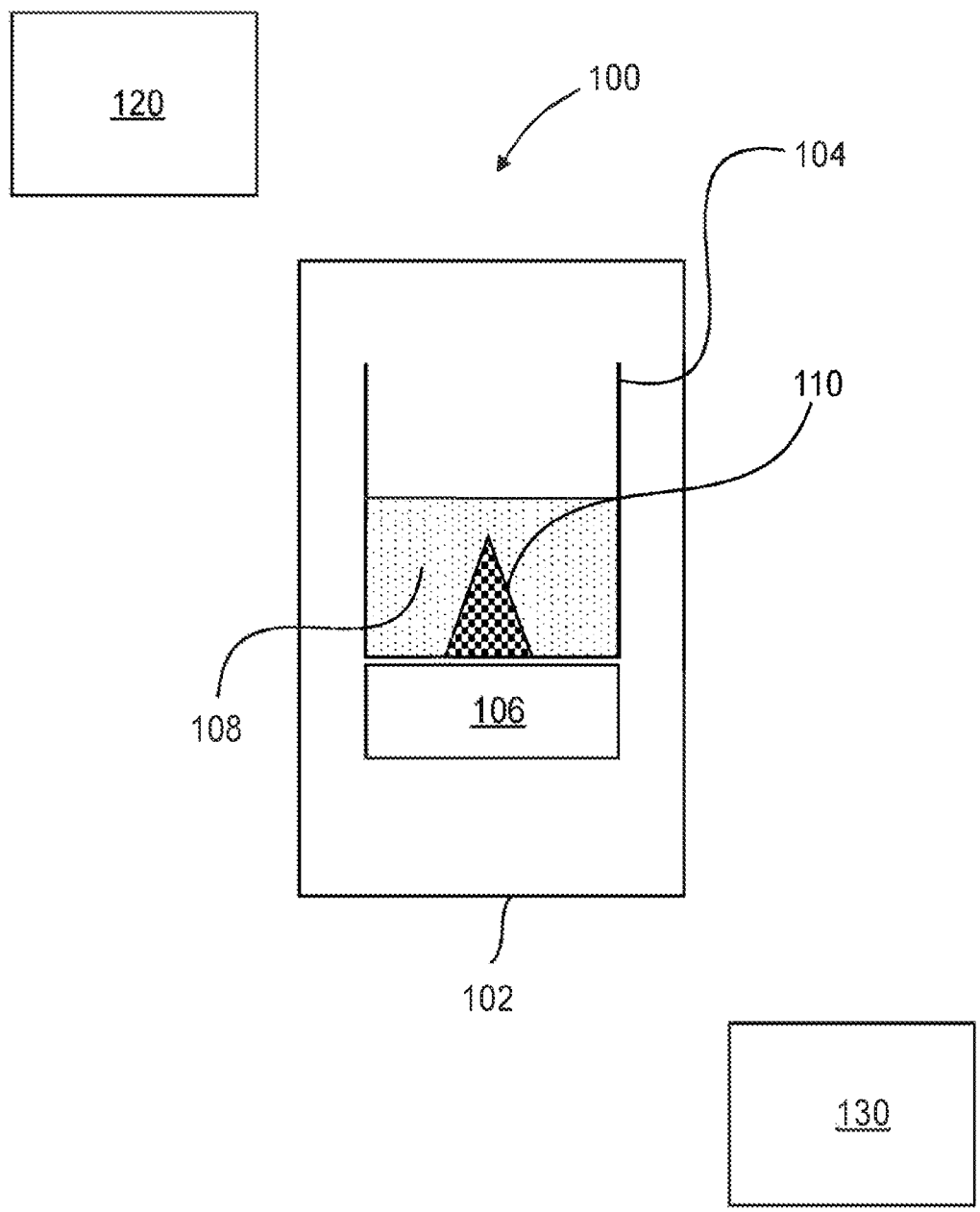
FIG. 1 illustrates a schematic front view of an apparatus for post-processing an additively manufactured part according to an embodiment.

FIG. 1 shows an apparatus 100 for post-processing a powder-based additively manufactured part according to an embodiment of the disclosure.

The apparatus 100 is made up of a processing chamber 102 for an additively manufactured part 110, a reservoir in the form of a solvent bath 104 and a heating element 106.

The solvent bath 104 is located within the processing chamber 102 and is configured for storing a solvent 108 to be used during a post-processing operation, as shall be described in greater detail at a later stage within this disclosure. The solvent bath 104 is of a size and configuration such that an additively manufactured part 110 can be entirely submerged within the solvent 108 during the post-processing operation.

The heating element 106 is located proximal to the solvent bath 104 and is coupled to a controller (not shown) configured to control the heating element 106 so as to heat the solvent 108 to a desired temperature during the post-processing operation. In this embodiment, the desired temperature is below a melting temperature of the material of the part 110.

In exemplary embodiments, the apparatus 100 may form part of an additive manufacturing system, which also includes a powder-based additive manufacturing apparatus 120 configured for additively manufactured the part 110, prior to the part 110 being post-processed by the apparatus 100.

In such embodiments, the powder-based additive manufacturing apparatus 120 may be a laser sintering apparatus or a multi-jet fusion apparatus. However, in other embodiments, other powder-based additive manufacturing apparatus types may be used.

During powder-based additive manufacturing processes, such as Selective Laser Sintering or Multi-Jet Fusion, a first layer of powder build material is laid down onto a build bed. The first layer of powder build material is then sintered to form the first sintered layer of the additively manufactured part.

A second layer of powder build material is then laid onto the first sintered layer. The second layer of powder build material is then subsequently sintered to form a second sintered layer of the additively manufactured part. Subsequent layers are then applied and sintered in the same fashion thereafter, until a part having a desired shape has been built from multiple sintered layers.

It has been found that the material at any surface of the additively manufactured part may often exhibit a different, less favourable structure to that of the material which is beneath said surface, and which may result in additively manufactured parts having a rough surface finish. The material at the surface of the part may often exhibit a looser structure/morphology, which is typically much weaker than the material beneath the surface of the additively manufactured part.

It has been found that the less favourable material at the surface of the part can be processed using at least one solvent selected from an organic ester, an aromatic organic compound or an acetal, and subsequently an improved surface finish can be achieved (e.g. for post-processing the additively manufactured part).

A method of post-processing a powder-based additively manufactured part according to an embodiment of the disclosure shall now be described with reference to FIG. 2.

At a first step 201 of the method, the raw-state additively manufactured part 110 is provided (e.g. in the state that it was immediately after the build operation). The part is typically manufactured from a thermoplastic material.

Figure 2:
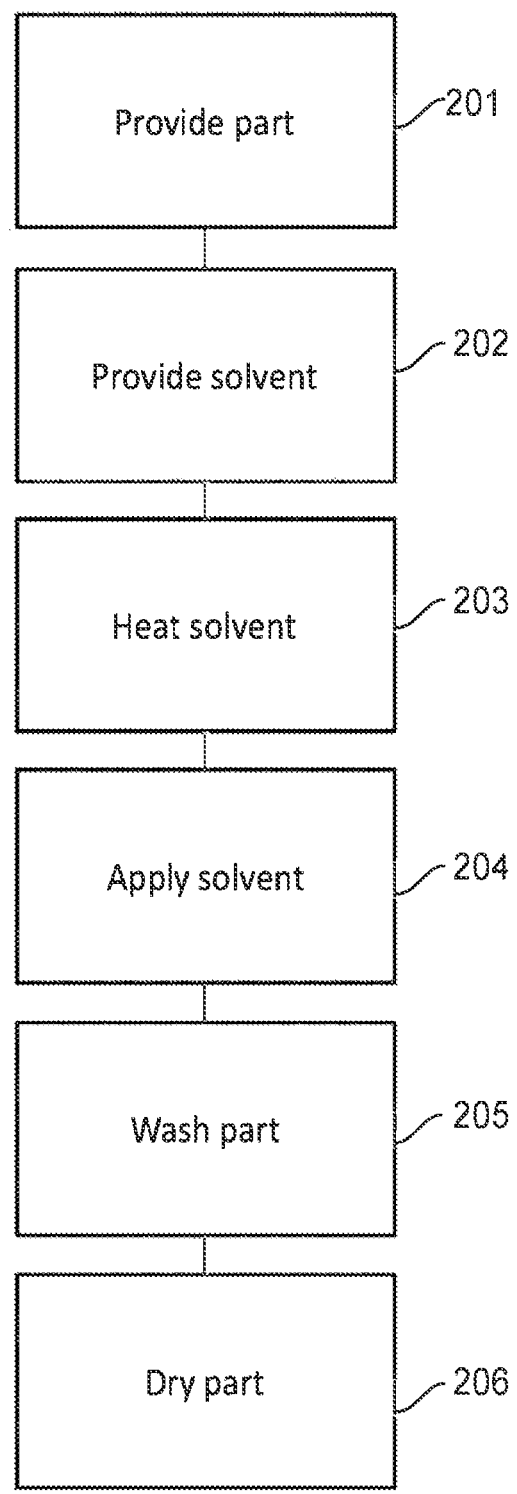
FIG. 2 illustrates a schematic flow diagram depicting a method for post-processing an additively manufactured part using the apparatus illustrated in FIG. 1.

In the embodiment illustrated in FIGS. 1 and 2, the additively manufactured part 110 is an additively manufactured Polypropylene (PP) part obtained from a powder-based additive manufacturing method, such as Selective Laser Sintering or Multi-Jet Fusion, as has been specified above.

Alternative examples of materials of which the additively manufactured part 110 may comprise include, but are not limited to, Thermoplastic Polyurethane (TPU), Nylon 12, Nylon 11, Nylon 6, Thermoplastic Elastomer (TPE), Acrylonitrile butadiene styrene (ABS), Acrylonitrile styrene acrylate (ASA), Polycarbonate (PC), Polyvinylidene fluoride (PVDF), Polyphenylene Sulfide (PPS), Polybutylene terephthalate (PBT), Polyether Ether Ketone (PEEK), Polyether Ketone Ketone (PEKK), Ethylene Propylene Diene Monomer Rubber (EDPM), Nitrile Rubber (NBR), Polymethyl Methacrylate (PMMA), Polyethylene (PET), Polyethylene Furanoate (PEF), Polylactic Acid (PLA), Thermoplastic Polyamide (TPA), Polyoxymethylene (POM), Polyvinyl Chloride (PVC), Thermoplastic Copolyester (TPC), Polyether Block Amide (PEBA), ULTEM™ 9085 or ULTEM™ 1010.

At step 202 of the method, a fluid 108 is provided comprising a solvent selected from one of the following groups:

Organic Esters
Aromatic Organic Compounds
Acetals

Typically, the solvent selected from these groups is one of Acetophenone, Formaldehyde Dibutyl Acetal or Benzyl Acetate. However, it shall be appreciated that in other embodiments, other solvents within the aforementioned groups may be used. For example, in other embodiments, the solvent may comprise Phenol, Benzophone and/or 1-2-4 trichlorobenzene, Aminoacetaldehyde Dimethyl Acetal, Acetaldehyde Diethyl Acetal, Acrolein Diethyl Acetal, Phenylacetaldehyde Dimethyl Acetal, Anisaldehyde Dimethyl Acetal, Citral Diethyl Acetal, 2,2-Diethoxyacetophenone and Ethyl Diethoxyacetate, Amyl Acetate, Methyl Acetate, Ethyl Acetate, Benzene, Dimethylbenzene, Cyclohexanone and/or Cyclohexane.

It shall also be appreciated that when the method is used for processing Thermoplastic Polyuethane, ketone solvents such as Acetophenone, Benzophenone, cyclohexanone and Dihydrolevoglucosenone, or organosulfur compounds such as Dimethyl sulfoxide (DMSO) may also be used.

In the embodiment illustrated in FIGS. 1 and 2, the fluid 108 is a liquid solvent (e.g. a liquid Formaldehyde Dibutyl Acetal solvent). Once the liquid solvent 108 is provided within the solvent bath 104, the solvent 108 is heated, under atmospheric pressure, via the heating element 106.

The solvent 108 is heated to a temperature suitable for overcoming the bonds between particles of the material at the surface of the additively manufactured part, but below the melting point of the material of the additively manufactured.

Keeping the temperature of the solvent below the melting point of the material of the additively manufactured part helps to avoid causing structural deformation to the additively manufactured part. Indeed, it has also been found using temperatures up to a maximum of 5° C. below the melting point of the material of the additively manufactured part can help to avoid structural deformation of the part.

When processing Polypropylene, it has also been found that the effectiveness of the process is improved when using solvent temperatures no less than 80° C. below the melting point of the material of the additively manufactured part.

It has also been found that the effectiveness of the process is improved when using acetal solvents having a boiling temperature of 100° C.

However, it shall also be appreciated that when the process is performed using different materials and/or solvents, the preferred solvent temperatures may vary as is set out in the appended Summary and Experimental Examples sections.

Furthermore, when post-processing is performed under specific conditions (i.e. close to the melting temperature of the material of the additively manufactured part), the method is also able to more effectively process chemical resistant materials, such as polypropylene, to achieve an improved surface finish as shall be described in greater detail below.

Generally, chemical resistant materials tend to exhibit a crystallinity below 60%, and more typically in the range of 15% to 30%.

At higher crystallinities, such as those in the range of 15% to 30%, the molecules which make up the material of the additively manufactured part exhibit a more ordered structural arrangement. This enables stronger bonds to be formed between the molecules which make up the material, which in turn makes the material more resistant to chemical attack.

In the embodiment illustrated in FIGS. 1 and 2, the solvent 108 is heated to a temperature in the range of 80° C. to 160° C., which is between 5° C. to 80° C. below the melting point of polypropylene as illustrated in step 203.

However, it shall also be appreciated that when the process is performed using different materials and/or solvents, the preferred solvent temperatures may vary as is set out in the appended Summary and Experimental Examples sections.

For example, it has been found that optimal processing of powder-based additively manufactured parts made from polypropylene, when using an acetophenone solvent, can be obtained at temperatures in the range of 110° C. to 160° C., which is between 5° C. to 50° C. below the melting point of polypropylene. It shall also be appreciated that in embodiments in which parts formed from materials other than polypropylene are to be processed, or in which alternative solvents are used, the temperatures to which the solvent is heated may differ.

For example, it has been found that optimal processing of polypropylene can be obtained at temperatures in the region of 100° C. when using Formaldehyde Dibutyl Acetal solvents.

Once the liquid solvent has been heated to the desired temperature, the part 110 is submerged within solvent bath 104 in order to apply the liquid solvent 108 onto the surface of the part 110, as is illustrated in step 204.

In alternative embodiments, it shall also be appreciated that the part 110 may be submerged into the solvent bath 104 prior to the liquid solvent 108 being heated.

Once the part 110 has been submerged and the liquid solvent 108 is at the desired temperature, the part 110 is left within the solvent bath 104 for period of time, typically in the range of 2 to 5 minutes, to allow for post-processing of the part 110. However, in some embodiments, the part may be left within the solvent bath for periods of up to two hours.

It has been found that by providing the solvent 108 as a liquid, and then applying the solvent 108 onto the surface of the part 110 via submerging the part 110 in the liquid solvent 108, can help to achieve a more effective improvement in the surface finish of the additively manufactured part.

Once the part 110 has been processed, the part 110 is removed from the liquid bath 104 before being washed at step 205.

In the embodiment illustrated in FIGS. 1 and 2, the part 110 is washed via rinsing with water to remove any excess solvent 108 from the part 110. However, in other embodiments, another suitable liquid such as alcohol or acetone may be used, or in yet further embodiments, the washing step may be omitted.

The part 110 is then dried at step 206. In the embodiment illustrated in FIGS. 1 and 2, the part 110 is dried via removing the part from the processing chamber 102 and placing the part into a vacuum oven (i.e. a second processing chamber 130).

During the drying step 206, the part 110 is heated to a temperature above a boiling point of the acetal solvent. This helps to remove any unwanted solvent from the part after processing, which helps to avoid any unwanted removal of material from the part or other adverse effects which may be caused by over-exposure to the solvent.

Typically, the drying step involves heating the additively manufactured part to a temperature in the range of 70° C. to 100° C., and preferably 80° C. to 90° C. for approximately 30 minutes.

These parameters have been found to help better stabilise the additively manufactured part after processing, which helps to prevent crystallisation of the surface of the part which can lead to discolouration.

In some embodiments, instead of the drying step, a final processing step may instead be performed which involves altering at least one of a temperature of the processing chamber, a pressure applied to the processing chamber and/or processing time.

It has been found that processing the powder-based additively manufactured part under different conditions can be used to manipulate the surface crystallinity of the part so as to improve the texture, gloss level and/or colour of the part.

In some embodiments, the final processing step involves cooling the additively manufactured part to a temperature of between −30° C. and 70° C. which has been found to modify the surface crystallinity of the part, thereby turning the part white.

It has also been found that this effect is particularly prevalent for polypropylene parts due to the specific molecular structure of polypropylene.

Figure 3A:
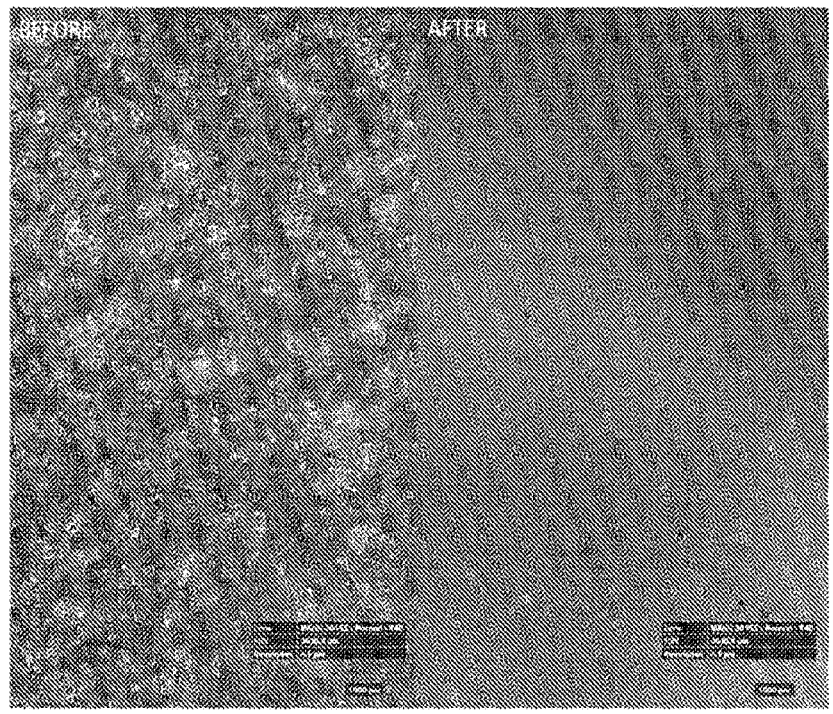
FIG. 3a is a microscopy image illustrating the results of the method illustrated in FIG. 2 when performed using Formaldehyde Diethyl Acetal.
Figure 3B:
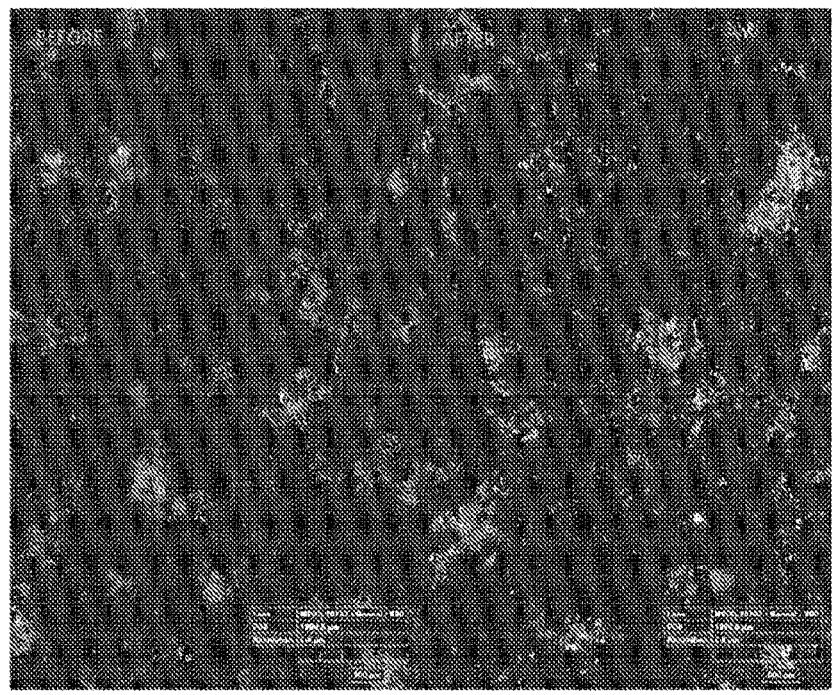
FIG. 3b is a microscopy image illustrating the results of the method illustrated in FIG. 2 when performed using an Acetaldehyde Diethyl Acetal.

As a result of the aforedescribed process, an improved surface finish was observed in the part as is illustrated in FIGS. 3a and 3b.

In the microscopy image shown in FIG. 3a, the roughness of an additively manufactured Polypropylene part was reduced using a Formaldehyde Dibutyl Acetal solvent from an initial (as processed) average surface roughness of 12.35 microns (see image on left) to a smoothed (final) average roughness of 0.55 microns (see image on right) which is an improvement of 95.5%.

Similarly, In the microscopy image shown in FIG. 3b, the roughness of an additively manufactured Polypropylene part was reduced using an Acetaldehyde Diethyl Acetal solvent from an initial (as processed) average surface roughness of 5.768 microns (see image on left) to a smoothed (final) average roughness of 3.951 microns (see image on right).

It shall also be appreciated that similar smoothing effects were also observed when carrying out the aforementioned method using other material and solvent types as are set out in the appended experimental examples.

Figure 4:
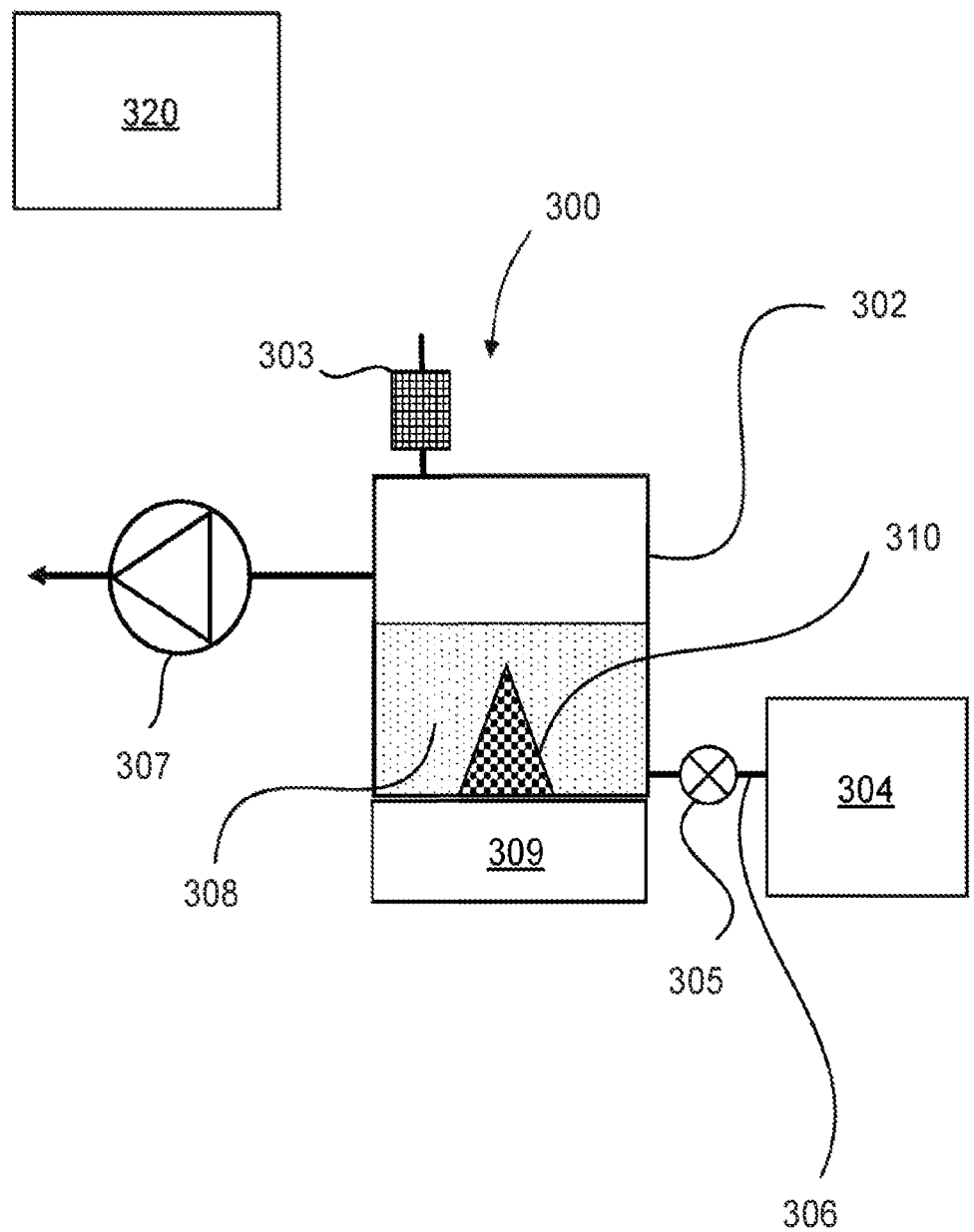
FIG. 4 illustrates a schematic front view of an apparatus for post-processing an additively manufactured part according to an alternative embodiment.

An apparatus 300 for post-processing a powder-based additively manufactured part according to an alternative embodiment is illustrated in FIG. 4.

The apparatus 300 illustrated in FIG. 4 is configured for processing an additively manufactured part 310 via a vapour 308, and is made up of a gas-tight processing chamber 302, a reservoir 304 and a vapour distribution system 306.

The gas-tight processing chamber 302 is configured to receive the additively manufactured part 310 and is fluidically-connected to the reservoir 304 via the vapour distribution system 306.

The vapour distribution system 306 is provided in the form of a pipe having a first end located at an outlet of the reservoir 304 and having a second end located at an inlet of the processing chamber 302. In use, the vapour distribution system 306 is configured to deliver the vapour 308 from the reservoir 304 to the processing chamber 302.

The vapour distribution system 306 also includes a valve 305 to enable the introduction of the vapour 308 into the processing chamber 302 to be controlled.

The apparatus 300 further includes a vacuum pump 307 which is in fluid communication with an interior of the processing chamber 302. In use, the vacuum pump 307 is configured to control the pressure applied to the interior of the processing chamber 302 as may be required during the process.

The apparatus 300 also includes a heating element 309 which forms part of a wall of the processing chamber 302 and is coupled to a controller (not shown), configured to control the heating element 309 so as to heat the vapour 308 within the processing chamber 302 to a desired temperature as shall be described in greater detail below.

As with the apparatus described in FIG. 1, in exemplary embodiments, the apparatus 300 may form part of an additive manufacturing system, including a powder-based additive manufacturing apparatus 320 configured for additively manufactured the part 310, prior to post-processing using the apparatus 300.

In such embodiments, the powder-based additive manufacturing apparatus 320 may be a laser sintering apparatus or a multi-jet fusion apparatus. However, in other embodiments, other such powder-based additive manufacturing apparatus types may be used.

A method of post-processing a powder-based additively manufactured part according to an alternative embodiment of the disclosure shall now be described with reference to FIG. 5.

At a first step 401, an additively manufactured part 310 is provided and placed within the processing chamber 302. The method for providing the part 310 at step 401 is substantially the same as that which is described in step 201 of the method described for FIG. 2 and so, for conciseness, shall not be described again in this section of the application.

The fluid 308 is provided at step 402. Unlike the embodiment of FIGS. 1 and 2, the fluid 308 of the embodiment of FIGS. 3 and 4 is provided in the form of a vapour 308 (such as an Acetophenone solvent vapour).

The vapour 308 is delivered from the reservoir 304 into the processing chamber 302 via opening the valve 305 of the vapour distribution system 306 and allowing the vapour 305 to flow into the processing chamber 302.

Once the solvent vapour 308 has been introduced into the processing chamber 302, the solvent 308 is heated in step 403, via the heating element 309, to a temperature suitable for overcoming the bonds between particles of the material at the surface of the additively manufactured part. In chemical resistant materials, said temperature generally corresponds to a temperature close to the melting point of the material of the additively manufactured part, but below the melting point of the material of the additively manufactured.

Figure 5:
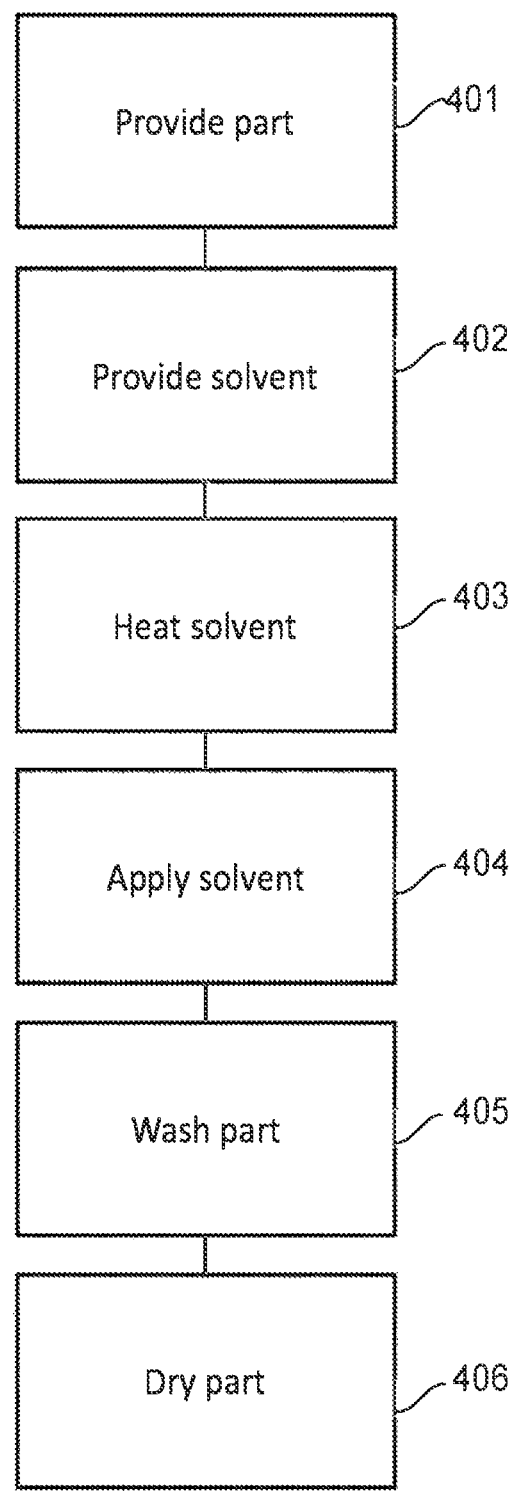
FIG. 5 illustrates a schematic flow diagram depicting an alternative method for post-processing an additively manufactured part using the apparatus illustrated in FIG. 4.

By heating the solvent to a temperature within this range, the method of the embodiment illustrated in FIG. 5 has been found to more effectively improve the surface finish of the part, whilst also helping to reduce the likelihood of the part becoming damaged due to excessive temperatures.

However, in other embodiments in which the solvent is applied as a solvent vapour, it shall be appreciated that the solvent may be heated to temperatures above the melting point of the material of the additively manufactured part.

The vacuum pump 307 is also operated during step 403 to apply a negative pressure to the interior of the processing chamber 302. Typically, the pressure within the processing chamber 302 is maintained below 1 bar.

By maintaining the processing chamber 302 at a pressure below 1 bar, it has been found that the solvent can be vaporised at lower temperatures than would otherwise be obtainable. This helps to further reduce the likelihood of the part becoming damaged due to temperature during the process. It has also been found that this effect is particularly prevalent at pressures in the range of 10 mbar to 400 mbar. That is because the range of 10 mbar to 400 mbar corresponds to the boiling temperatures of the solvent that are close to melting point of the Polypropylene according to the FIG. 5.

It shall also be appreciated that in embodiments in which powder-based parts formed from materials other than Polypropylene are to be processed, or in which alternative solvents are used, the temperatures and pressures to which the solvents are exposed may differ as is set out in the appended Summary and Experimental Examples Sections.

Furthermore, the application of a negative pressure to the processing chamber 302 also aids in drawing the vapour 308 from the reservoir 304 and into the processing chamber 302 upon opening of the valve 305 at step 402.

Once the vapour 308 has reached the desired temperature and the processing chamber is maintained at the required pressure, the solvent starts to vaporise.

It will be understood that the temperature of the surface of the part 310 is initially lower than a condensation temperature of the solvent vapour 308 within the processing chamber 302. As such, any solvent vapour 308 which comes into contact with the surface of the part 310 becomes condensed onto the surface of the part 310, thereby applying the solvent 308 onto the surface of the part 310.

The Pressure-Temperature graph of the used solvent (e.g. Acetophenone) helps to guide when choosing the operating pressures and temperatures.

In exemplary embodiments, the part 310 is also cooled, for example using a blast chiller, prior to being placed into the processing chamber 302. This achieves a greater temperature different between the part 310 and the solvent vapour 308, which allows for more effective condensation (and hence application) of solvent vapour 308 onto the surface of the part.

However, in other embodiments, the part 310 may be heated prior to the application of the solvent to help improve the efficiency of the process. In embodiments wherein the part 310 is heated prior to the application of the solvent vapour, the part 310 is typically heated to a temperature of no more than 130° C.

It shall also be appreciated that, in other embodiments, the solvent reservoir 304 may be provided with a heating element and the solvent 308 may be heated to the desired temperature within the solvent reservoir 304, prior to the solvent vapour 308 being introduced into the processing chamber 302. Advantageously, this helps to maintain a temperature difference between the additively manufactured part and the vapour, which can consequently help to achieve greater amounts of vapour condensation onto the additively manufactured part during processing.

After application of the solvent vapour 308 onto the surface of the part 310 at step 404, the part 310 is then left for a period of time. It has been found that a period between 1 hour and 6 hours is sufficient to allow for post-processing of the part 310.

Whilst processing times for the method described in FIG. 5 are typically longer than those used for the equivalent solvent bath method, described in FIG. 2, the method described in FIG. 4 is more easily automatable than the method illustrated in FIG. 2, and so provides the benefit of reducing operator workload for post-processing additively manufactured parts.

Once the part has been left, the part 310 is then washed at step 305 in the same manner as is described in step 205 illustrated in FIG. 2.

After the part has been washed at step 305, the part 310 is then dried at step 306.

Unlike the embodiment illustrated in FIGS. 1 and 2, in the embodiment illustrated in FIGS. 4 and 5, the part 310 can be dried in the same processing chamber 302 as is used for post-processing, and hence this method helps to further improve processing efficiency.

However, it shall also be appreciated that in other embodiments the part may be removed from the processing chamber 302 and placed in a vacuum oven during step 406, in substantially the same manner as is described in step 206 of FIG. 2.

In some embodiments, the drying step may also involve altering at least one of a temperature of the processing chamber, a pressure applied to the processing chamber and/or processing time during the drying step.

The evaporated solvent 308 can then be evacuated from the processing chamber 302 to the external atmosphere via a filter, such as an active-carbon filter 303.

The dried part 310 is removed from the processing chamber 302 thereby ending the process.

It has been found that drying the powder-based additively manufactured part under different conditions can be used to manipulate the surface crystallinity of the part so as to improve the texture, gloss level and/or colour of the part.

For example, in some other embodiments, rather than a drying process being performed, a final processing step may instead be performed which involves altering at least one of a temperature of the processing chamber, a pressure applied to the processing chamber and/or processing time.

It has been found that processing the powder-based additively manufactured part under different conditions can be used to manipulate the surface crystallinity of the part so as to improve the texture, gloss level and/or colour of the part.

In some embodiments, the final processing step involves cooling the additively manufactured part to a temperature of between −30° C. and 70° C. which has been found to modify the surface crystallinity of the part, thereby turning the part white.

It has also been found that this effect is particularly prevalent for polypropylene parts due to the specific molecular structure of polypropylene.

A method according to a further alternative embodiment for post-processing powder-based additively manufactured parts, particularly those comprising PEEK or PEKK, shall now be described with reference to FIGS. 7 and 8.

At a first step 601 of the method, the raw-state additively manufactured part 510 is provided (e.g. in the state that it was immediately after the build operation).

Figure 7:
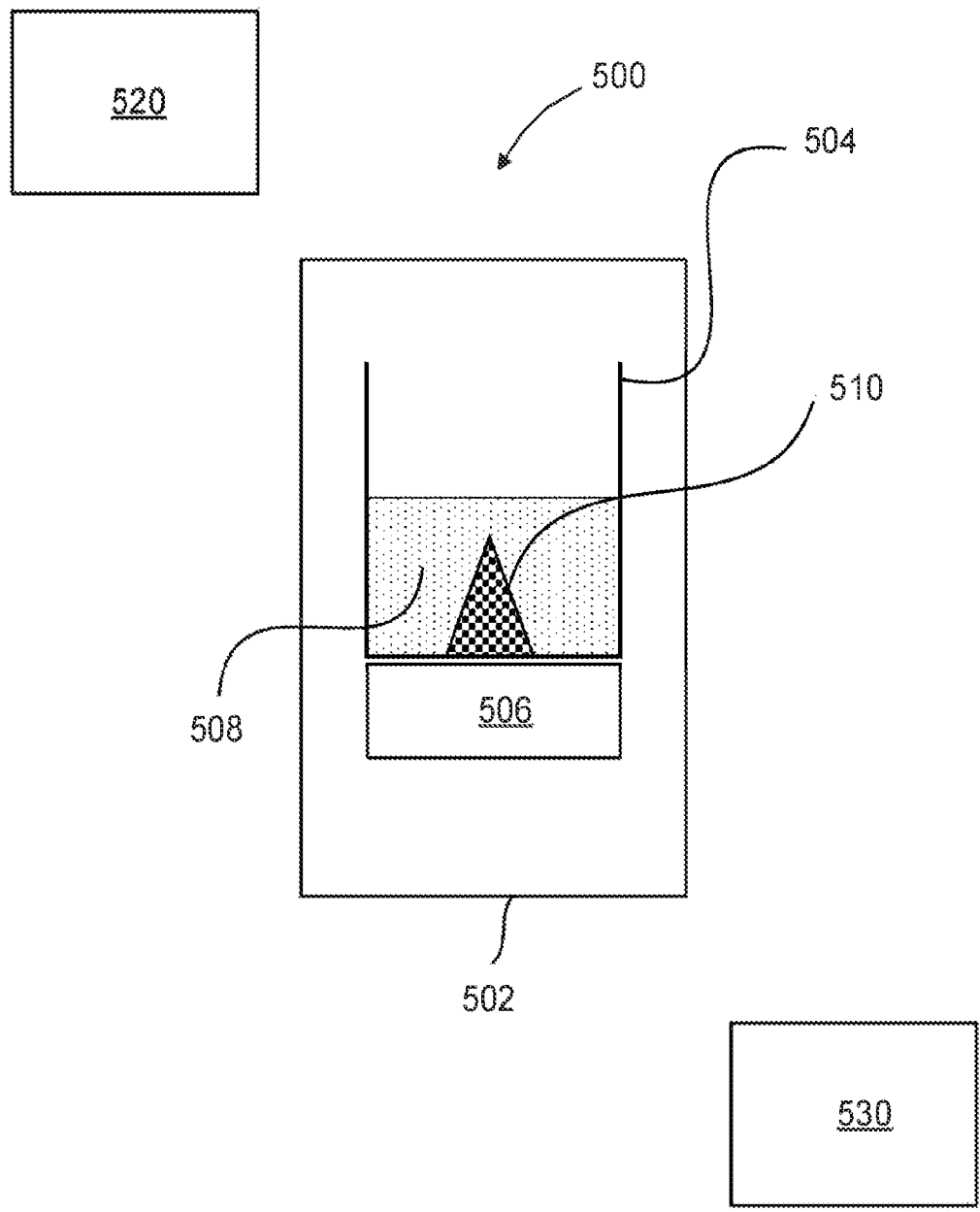
FIG. 7 illustrates a schematic front view of an apparatus for post-processing an additively manufactured part according to an alternative embodiment.
Figure 8:
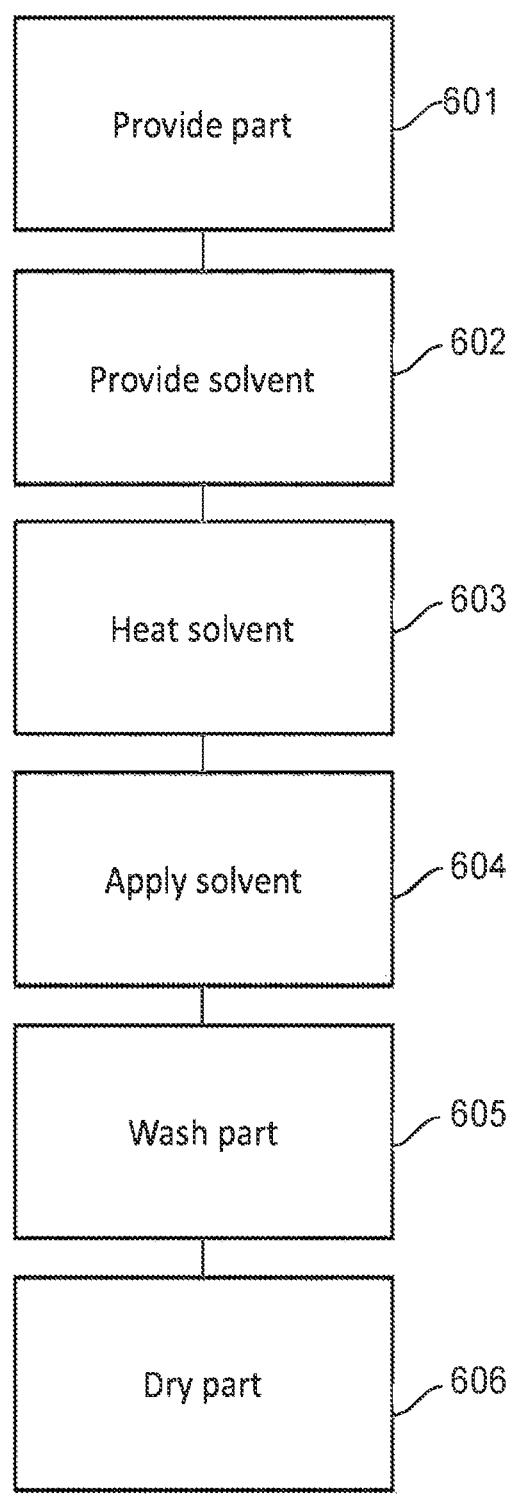
FIG. 8 illustrates a schematic flow diagram depicting a method for post-processing an additively manufactured part according to an alternative embodiment.

In the embodiment illustrated in FIGS. 7 and 8, the additively manufactured part 510 is made from a chemically resistant material (i.e. a material having a relatively high crystallinity) such as Polyether ether ketone (PEEK) or Polyether ketone ketone (PEKK). Typically, the part is obtained from a powder-based additive manufacturing method, such as Selective Laser Sintering or Multi-Jet Fusion, as has been specified previously. However, in other embodiments, the additively manufactured part may be of a different material.

At step 602 of the method, a fluid 508 is provided comprising a solvent. Typically, the solvent is a dichloroacetic acid solvent. However, it shall be appreciated that in other embodiments, the solvent may be an inorganic acid such as Sulfuric acid.

Figure 6:
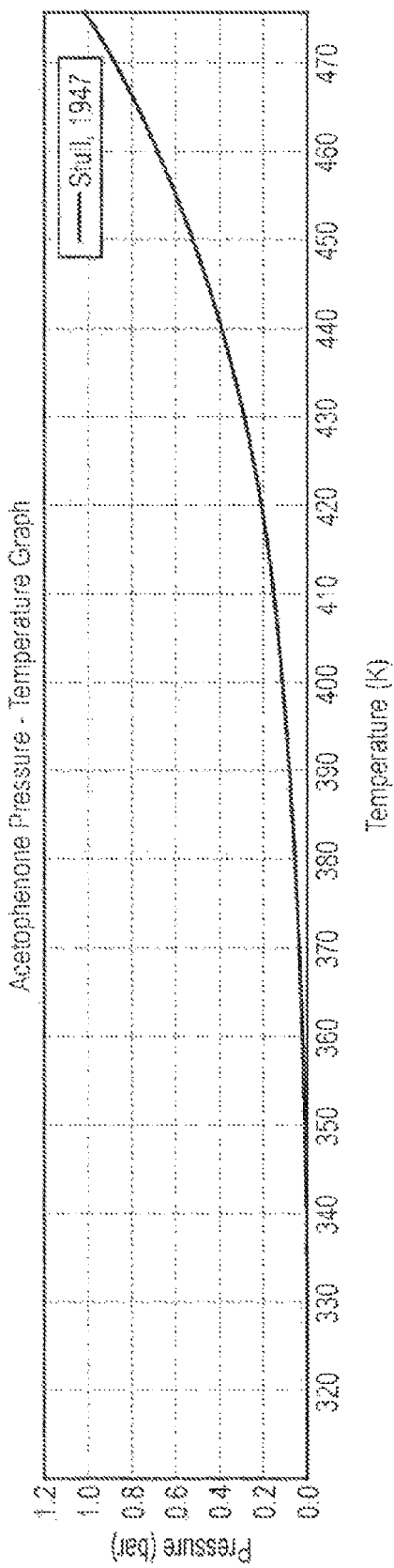
FIG. 6 illustrates a Pressure-Temperature graph of an Acetophenone solvent suitable for use in the method of FIGS. 2 and 5.

As with the embodiment illustrated in FIGS. 1 and 2, in the embodiment described in FIGS. 6 and 7, the fluid 508 is a liquid solvent applied using substantially the same apparatus as is described in FIG. 1 and so, for conciseness, the apparatus shall not be described again in this section of the application. However, for clarity, like components have been denoted with corresponding reference numerals having the prefix "5".

Once the liquid solvent 508 is provided within the solvent bath 504, the solvent 508 is heated, under atmospheric pressure, via the heating element 506 at step 603 to a temperature of at least 90° C.

The part 510 is then submerged within solvent bath 504 in order to apply the liquid solvent 508 onto the surface of the part 510, as is illustrated in step 604.

In alternative embodiments, it shall also be appreciated that the part 510 may be submerged into the solvent bath 504 prior to the liquid solvent 108 being heated.

Once the part 510 has been submerged and the liquid solvent 508 is at the desired temperature, the part 510 is left within the solvent bath 504 for period of time, typically up to 2 hours, to allow for post-processing of the part 510.

It has been found that by providing the solvent 508 as a liquid, and then applying the solvent 508 onto the surface of the part 510 via submerging the part 510 in the liquid solvent 508, a more effective improvement in the surface finish of the additively manufactured part can be achieved.

Once the part 510 has been processed, the part 510 is removed from the liquid bath 504 before being washed and dried at steps 605 and 606 in substantially the same manner as has been previously described with reference to FIG. 2.

Advantageously, it has been found that this method is able to efficiently smooth extremely chemically resistant materials, such as PEKK or PEEK, to provide such parts with a smooth surface finish, thereby increasing the range of applications in which additively manufactured PEEK and PEKK parts can be used.

As has been demonstrated in the afore-described embodiments, it has been found that the steps of providing a powder-based additively manufactured part, providing a fluid (i.e. a liquid or a gas) for processing the additively manufactured part comprising at least one solvent selected from an organic ester, an aromatic organic compound or an acetal, heating the fluid and applying the heated fluid to a surface of an additively manufactured part can help to improve the surface finish of the additively manufactured parts.

Whilst the aforementioned embodiments describe processing methods wherein the fluid substantial consists of a single solvent (e.g. Acetophenone or Formaldehyde Dibutyl Acetal), it shall be appreciated that in other embodiments, the fluid may be a combination of solvents and/or other fluids such as acids, alkalis, oils (e.g. essential oils such as nutmeg oil) and/or limonene, but wherein the percentage by volume of the fluid which comprises the solvent selected from an organic ester, an aromatic organic compound or an acetal is sufficient to improve the surface finish of the additively manufactured part.

In some embodiments, at least one of the fluids may be a plasticizer to help promote smoothing of the surface of the part and also to help to counter any unwanted effects of the solvents.

In some embodiments, at least one of the fluids may be 2-methoxypropanol or n,n-dimethylacetamide to help to reduce the flammability and volatility of the solvent mixture.

It shall also be appreciated that in some embodiments, the application step may be repeated.

Furthermore, in further embodiments, the method may be repeated using different solvents or fluids.

Finally, whilst the disclosure of FIGS. 1 and 2 are described in relation to a solvent bath located within a processing chamber, it shall also be appreciated that, in other embodiments, the feature of a processing chamber 102 may also be omitted, and the method may be performed, for example, using an open bath.

EXPERIMENTAL EXAMPLES

Example 1

As an example, the afore-described methodology was used for processing a powder-based additively manufactured part manufactured via Selective Laser Sintering using an Ultrasint™ grade of Polypropylene (available from BASF SE), having a melting point of 140° C.

The part was submerged into a resin bath containing a Formaldehyde Dibutyl Acetal 99% liquid solvent, maintained at a temperature between 90° C. and 140° C. for a period of up to 2 hours.

The aforementioned methodology was also used for processing a powder-based additively manufactured part manufactured via Selective Laser Sintering using a different grade of Polypropylene (available from Ricoh), having a melting point of 160° C.

The part was submerged into a resin bath containing a Formaldehyde Dibutyl Acetal 99% liquid solvent, maintained at a temperature between 90° C. and 160° C. for a period of up to 2 hours.

In both instances, following processing, an improved surface finish was observed.

Example 2

As an example, the afore-described methodology was used for processing a powder-based additively manufactured part manufactured via Selective Laser Sintering using an Ultrasint™ grade of Polypropylene (available from BASF SE), having a melting point of 140° C.

The part was submerged into a resin bath containing an Aminoacetaldehyde Dimethyl Acetal 99% liquid solvent, maintained at a temperature between 90° C. and 140° C. for a period of up to 2 hours.

The aforementioned methodology was also used for processing a powder-based additively manufactured part manufactured via Selective Laser Sintering using a different grade of Polypropylene (available from Ricoh), having a melting point of 160° C.

The part was submerged into a resin bath containing an Aminoacetaldehyde Dimethyl Acetal 99% liquid solvent, maintained at a temperature between 90° C. and 140° C. for a period of up to 2 hours.

In both instances, following processing, an improved surface finish was observed.

Example 3

As an example, the afore-described methodology was used for processing a powder-based additively manufactured part manufactured via Selective Laser Sintering using an Ultrasint™ grade of Polypropylene (available from BASF SE), having a melting point of 140° C.

The part was submerged into a resin bath containing an Acetaldehyde Diethyl Acetal 99% liquid solvent, maintained at a temperature between 80° C. and 105° C. for a period of up to 2 hours.

The aforementioned methodology was also used for processing a powder-based additively manufactured part manufactured via Selective Laser Sintering using a different grade of Polypropylene (available from Ricoh), having a melting point of 160° C.

The part was submerged into a resin bath containing an Acetaldehyde Diethyl Acetal 99% liquid solvent, maintained at a temperature between 80° C. and 105° C. for a period of up to 2 hours.

In both instances, following processing, an improved surface finish was observed.

Example 4

As an example, the afore-described methodology was used for processing a powder-based additively manufactured part manufactured via Selective Laser Sintering using an Ultrasint™ grade of Polypropylene (available from BASF SE), having a melting point of 140° C.

The part was submerged into a resin bath containing an Acrolein Diethyl Acetal 99% liquid solvent, maintained at a temperature between 90° C. and 135° C. for a period of up to 2 hours.

The aforementioned methodology was also used for processing a powder-based additively manufactured part manufactured via Selective Laser Sintering using a different grade of Polypropylene (available from Ricoh), having a melting point of 160° C.

The part was submerged into a resin bath containing an Acrolein Diethyl Acetal 99% liquid solvent, maintained at a temperature between 90° C. and 135° C. for a period of up to 2 hours.

In both instances, following processing, an improved surface finish was observed.

Example 5

As an example, the afore-described methodology was used for processing a powder-based additively manufactured part manufactured via Selective Laser Sintering using an Ultrasint™ grade of Polypropylene (available from BASF SE), having a melting point of 140° C.

The part was submerged into a resin bath containing an Phenylacetaldehyde Dimethyl Acetal 99% liquid solvent, maintained at a temperature between 90° C. and 140° C. for a period of up to 2 hours.

The aforementioned methodology was also used for processing a powder-based additively manufactured part manufactured via Selective Laser Sintering using a different grade of Polypropylene (available from Ricoh), having a melting point of 160° C.

The part was submerged into a resin bath containing an Phenylacetaldehyde Dimethyl Acetal 99% liquid solvent, maintained at a temperature between 90° C. and 160° C. for a period of up to 2 hours.

In both instances, following processing, an improved surface finish was observed.

Example 6

As an example, the afore-described methodology was used for processing a powder-based additively manufactured part manufactured via Selective Laser Sintering using an Ultrasint™ grade of Polypropylene (available from BASF SE), having a melting point of 140° C.

The part was held at a temperature between 20° C. and 130° C. and placed into a processing chamber which was then vacuumed to a pressure of between 70 mbar and 400 mbar. A Formaldehyde Dibutyl Acetal vapour held at a temperature of between 100° C. and 150° C. was then introduced into the chamber and condensed onto the surface of the part and left for a period of 1 hour. The solvent was then removed from the surface of the part.

The process was also repeated using a different grade of Polypropylene (available from Ricoh), having a melting point of 160° C.

In both instances, an improved surface finish was observed.

Example 7

As an example, the afore-described methodology was used for processing a powder-based additively manufactured part manufactured via Selective Laser Sintering using an Ultrasint™ grade of Polypropylene (available from BASF SE), having a melting point of 140° C.

The part was submerged into a resin bath containing an Acetophenone 99% liquid solvent, available from Alfa Aesar, maintained at a temperature between 110° C. and 140° C. for a period of up to 2 hours.

The aforementioned methodology was also used for processing a powder-based additively manufactured part manufactured via Selective Laser Sintering using a different grade of Polypropylene (available from Ricoh), having a melting point of 160° C.

The part was submerged into a resin bath containing an Acetophenone 99% liquid solvent, available from Alfa Aesar, maintained at a temperature between 110° C. and 160° C. for a period of up to 2 hours.

In both instances, following processing, an improved surface finish was observed.

Example 8

As an example, the afore-described methodology was used for processing a powder-based additively manufactured part manufactured via Selective Laser Sintering using an Ultrasint™ grade of Polypropylene (available from BASF SE), having a melting point of 140° C.

The part was submerged into a resin bath containing a Benzophenone 99% liquid solvent, maintained at a temperature between 110° C. and 140° C. for a period of up to 2 hours.

The aforementioned methodology was also used for processing a powder-based additively manufactured part manufactured via Selective Laser Sintering using a different grade of Polypropylene (available from Ricoh), having a melting point of 160° C.

The part was submerged into a resin bath containing a Benzophenone 99% liquid solvent, maintained at a temperature between 110° C. and 160° C. for a period of up to 2 hours.

In both instances, following processing, an improved surface finish was observed.

Example 9

As an example, the afore-described methodology was used for processing a powder-based additively manufactured part manufactured via Selective Laser Sintering using an Ultrasint™ grade of Polypropylene (available from BASF SE), having a melting point of 140° C.

The part was held at a temperature between 20° C. and 130° C. and placed into a processing chamber which was then vacuumed to a pressure of between 70 mbar and 400 mbar. An Acetophenone solvent vapour held at a temperature of between 100° C. and 150° C. was then introduced into the chamber and condensed onto the surface of the part and left for a period of 1 hour. The solvent was then removed from the surface of the part.

The process was also repeated using a different grade of Polypropylene (available from Ricoh), having a melting point of 160° C.

In both instances, an improved surface finish was observed.

Example 10

As an example, the afore-described methodology was used for processing a powder-based additively manufactured part manufactured via Selective Laser Sintering using an Ultrasint™ grade of Polypropylene (available from BASF SE), having a melting point of 140° C.

The part was submerged into a resin bath containing a Benzyl Acetate 99% liquid solvent, maintained at a temperature between 90° C. and 140° C. for a period of up to 2 hours.

The aforementioned methodology was also used for processing a powder-based additively manufactured part manufactured via Selective Laser Sintering using a different grade of Polypropylene (available from Ricoh), having a melting point of 160° C.

The part was submerged into a resin bath containing a Benzyl Acetate 99% liquid solvent, maintained at a temperature between 90° C. and 160° C. for a period of up to 2 hours.

In both instances, following processing, an improved surface finish was observed.

Example 11

As an example, the afore-described methodology was used for processing a powder-based additively manufactured part manufactured via Selective Laser Sintering using an Ultrasint™ grade of Polypropylene (available from BASF SE), having a melting point of 140° C.

The part was submerged into a resin bath containing an Amyl Acetate 99% liquid solvent, maintained at a temperature between 90° C. and 140° C. for a period of up to 2 hours.

The aforementioned methodology was also used for processing a powder-based additively manufactured part manufactured via Selective Laser Sintering using a different grade of Polypropylene (available from Ricoh), having a melting point of 160° C.

The part was submerged into a resin bath containing an Amyl Acetate 99% liquid solvent, maintained at a temperature between 90° C. and 150° C. for a period of up to 2 hours.

In both instances, following processing, an improved surface finish was observed.

Example 12

As an example, the afore-described methodology was used for processing a powder-based additively manufactured part manufactured via Selective Laser Sintering using an Ultrasint™ grade of Polypropylene (available from BASF SE), having a melting point of 140° C.

The part was held at a temperature between 20° C. and 130° C. and placed into a processing chamber which was then vacuumed to a pressure of between 10 mbar and 400 mbar. A Benzyl Acetate solvent vapour held at a temperature of between 100° C. and 180° C. was then introduced into the chamber and condensed onto the surface of the part and left for a period of 1 hour. The solvent was then removed from the surface of the part.

The process was also repeated using a different grade of Polypropylene (available from Ricoh), having a melting point of 160° C.

In both instances, an improved surface finish was observed.

Example 13

As an example, the afore-described methodology was used for processing a powder-based additively manufactured part manufactured via Selective Laser Sintering using an Ultrasint™ grade of Polypropylene (available from BASF SE), having a melting point of 140° C.

The part was submerged into a resin bath containing a 1,2,4-Trichlorobenzene 99% liquid solvent, maintained at a temperature between 90° C. and 140° C. for a period of up to 2 hours.

The aforementioned methodology was also used for processing a powder-based additively manufactured part manufactured via Selective Laser Sintering using a different grade of Polypropylene (available from Ricoh), having a melting point of 160° C.

The part was submerged into a resin bath containing a 1,2,4-Trichlorobenzene 99% liquid solvent, maintained at a temperature between 90° C. and 160° C. for a period of up to 2 hours.

In both instances, following processing, an improved surface finish was observed.

Example 14

As an example, the afore-described methodology was used for processing a powder-based additively manufactured part manufactured via Selective Laser Sintering using an Ultrasint™ grade of Polypropylene (available from BASF SE), having a melting point of 140° C.

The part was submerged into a resin bath containing a Dimethylbenzene 99% liquid solvent, maintained at a temperature between 90° C. and 140° C. for a period of up to 2 hours.

The aforementioned methodology was also used for processing a powder-based additively manufactured part manufactured via Selective Laser Sintering using a different grade of Polypropylene (available from Ricoh), having a melting point of 160° C.

The part was submerged into a resin bath containing a Dimethylbenzene 99% liquid solvent, maintained at a temperature between 90° C. and 160° C. for a period of up to 2 hours.

In both instances, following processing, an improved surface finish was observed.

Example 15

As another example, the afore-described methodology was used for processing a powder-based additively manufactured part manufactured via Selective Laser Sintering using an ESTANE™ grade of Thermoplastic Polyurethane (TPU) (available from The Lubrizol Corporation), having a melting point between 180° C. and 200° C.

The part was submerged into a resin bath containing a DMSO 99% liquid solvent, maintained at a temperature between 40° C. and 80° C. for a period of up to 2 hours.

Following processing, an improved surface finish was observed.

Example 16

As another example, the afore-described methodology was used for processing a powder-based additively manufactured part manufactured via Selective Laser Sintering using an ESTANE™ grade of Thermoplastic Polyurethane (TPU) (available from The Lubrizol Corporation), having a melting point between 180° C. and 200° C.

The part was submerged into a resin bath containing a Dihydrolevoglucosenone 99% liquid solvent, available from Sigma-Aldrich, maintained at a temperature between 40° C. and 120° C. for a period of up to 2 hours.

Following processing, an improved surface finish was observed.

Example 17

As another example, the afore-described methodology was used for processing a powder-based additively manufactured part manufactured via Selective Laser Sintering using an ESTANE™ grade of Thermoplastic Polyurethane (TPU) (available from The Lubrizol Corporation), having a melting point between 180° C. and 200° C.

The part was held at a temperature between −20° C. and 70° C. and placed into a processing chamber which was then vacuumed to a pressure of between 10 mbar and 200 mbar. A Dihydrolevoglucosenone solvent vapour held at a temperature of between 120° C. and 180° C. was then introduced into the chamber and condensed onto the surface of the part and left for a period of 1 hour. The solvent was then removed from the surface of the part.

Following processing, an improved surface finish was observed.

Example 18

As another example, the afore-described methodology was used for processing a powder-based additively manufactured part manufactured via Selective Laser Sintering using an ESTANE™ grade of Thermoplastic Polyurethane (TPU) (available from The Lubrizol Corporation), having a melting point between 180° C. and 200° C.

The part was held at a temperature between −20° C. and 70° C. and placed into a processing chamber which was then vacuumed to a pressure of between 10 mbar and 200 mbar. A DMSO solvent vapour held at a temperature of between 120° C. and 180° C. was then introduced into the chamber and condensed onto the surface of the part and left for a period of 1 hour. The solvent was then removed from the surface of the part.

Following processing, an improved surface finish was observed.

Example 19

As a further example, the afore-described methodology was used for processing a powder-based additively manufactured part manufactured via Selective Laser Sintering using a PEEK material having a melting point of 343° C.

The part was submerged into a resin bath containing a dichloroacetic acid maintained at a temperature of 120° C. The part was left submerged within the resin bath for a period of 1 hour.

The part was then washed and dried.

The process was also performed using a sulfuric acid using the same conditions as specified above.

In both instances, an improved surface finish of the material was observed.

Example 20

As a further example, the afore-described methodology was used for processing a powder-based additively manufactured part manufactured via Selective Laser Sintering using a PEKK material having a melting point of 343° C.

The part was submerged into a resin bath containing a dichloroacetic acid maintained at a temperature of 120° C. The part was left submerged within the resin bath for a period of 1 hour.

The part was then washed and dried.

The process was also performed using a sulfuric acid using the same conditions as specified above.

In both instances, an improved surface finish of the material was observed.

Example 21

In a further example, a plurality of surface roughness measures were taken on an as-printed powder-based additively manufactured part manufactured via Selective Laser Sintering using an Ultrasint™ grade of Polypropylene (available from BASF SE), having a melting point of 140° C.

The material was then processed as set out in Example 1.

Following processing, a plurality of surface roughness measures were taken on the part following the smoothing process. The respective topographies before and after processing are shown in FIG. 3A.

The roughness data was then compared as set out below.

| Measurement Location | Roughness (as printed)—Microns | Roughness (after smoothing)—Microns |
|---|---|---|
| 1 | 10.10 | 0.48 |
| 2 | 11.60 | 0.61 |
| 3 | 9.81 | 0.61 |
| 4 | 14.50 | 0.46 |
| 5 | 13.50 | 0.59 |
| 6 | 14.60 | 0.54 |
| Average | 12.35 | 0.55 |

As illustrated above, the average roughness of the part was reduced by 95.5% following processing.

The process was also performed using the process as set out in Example 3.

| Measurement Location | Roughness (as printed)—Microns | Roughness (after smoothing)—Microns |
|---|---|---|
| Average | 5.768 | 3.951 |

As illustrated above, the average roughness of the part was also reduced following processing.

Example 22

As an example, the afore-described methodology was used for processing a powder-based additively manufactured part manufactured via Selective Laser Sintering using an Ultrasint™ grade of Polypropylene (available from BASF SE), having a melting point of 140° C.

The part was submerged into a resin bath containing an Acetophenone 99% liquid solvent, available from Alfa Aesar, maintained at a temperature between 100° C. and 130° C.

The part was also subjected to a drying process. The drying process conditions were as follows:
Processing Chamber temperature: 60-90° C.
Processing Chamber pressure: 5-30 mbar The processing chamber temperature was set at a temperature which is higher than the boiling point of the Acetophenone solvent at the drying pressure of between 5-30 mbar.

As a result, an improved surface finish was observed.

Effective drying of the processed part was also observed.

Example 23

As a further example, the afore-described methodology was used for processing another powder-based additively manufactured part manufactured via Selective Laser Sintering using an Ultrasint™ grade of Polypropylene (available from BASF SE), having a melting point of 140° C.

The part was submerged into a resin bath containing an Acetophenone 99% liquid solvent, available from Alfa Aesar, maintained at a temperature between 110° C. and 120° C.

The parts was also subjected to a drying process. The drying process conditions were as follows:
Processing Chamber temperature: 60-90° C.
Processing Chamber pressure: 5-30 mbar The processing chamber temperature was set at a temperature which is higher than the boiling point of the Acetophenone solvent at the drying pressure of 5-30 mbar.

As a result, an improved surface finish was observed.

The observed surface finish obtained via processing at temperatures in the range of 110° C. to 120° C. was also more optimal than that which was observed via processing at temperatures in the range of 100° C. to 130° C.

More effective drying of the processed part was also observed at pressures in the range of 55-80 mbar than that which was observed at pressures in the range of 50-100 mbar.

Example 24

As a further example, the afore-described methodology was used for processing a powder-based additively manufactured part manufactured via Selective Laser Sintering using an Ultrasint™ grade of Polypropylene (available from BASF SE), having a melting point of 140° C.

The part was submerged into a resin bath containing a Formaldehyde Dibutyl Acetal liquid solvent maintained at a temperature of approximately 70° C. The part was then removed after a processing time of 2 minutes.

The part was also subjected to a drying process. The drying process conditions were as follows:
Processing Chamber temperature: 60-90° C.
Processing Chamber pressure: 5-30 mbar The processing chamber temperature was set at a temperature which is higher than the boiling point of the Formaldehyde Dibutyl Acetal solvent at the drying pressure of between 5-30 mbar.

As a result, a greatly improved surface finish was observed.

The surface finish observed for Example 3 was more effective than those observed for Examples 22 and 23.

Effective drying of the processed part was also observed.

Example 25

As a further example, the afore-described methodology was used for processing a powder-based additively manufactured part manufactured via Selective Laser Sintering using an Ultrasint™ grade of Polypropylene (available from BASF SE), having a melting point of 140° C.

The part was submerged into a resin bath containing a Formaldehyde Dibutyl Acetal liquid solvent maintained at a temperature of approximately 100° C. The part was then removed after a processing time of 2 minutes.

The part was also subjected to a drying process. The drying process conditions were as follows:
Processing Chamber temperature: 60-90° C.
Processing Chamber pressure: 5-30 mbar The processing chamber temperature was set at a temperature which is higher than the boiling point of the Formaldehyde Dibutyl Acetal solvent at the drying pressure of between 5-30 mbar.

As a result, an even more greatly improved surface finish was observed.

The surface finish observed for Example 4 was more effective than those observed for Examples 22, 23 and 24.

Effective drying of the processed part was also observed.

Example 26

As another example, the afore-described methodology was used for processing a powder-based additively manufactured part manufactured via Selective Laser Sintering using an ESTANE™ grade of Thermoplastic Polyurethane (TPU) (available from The Lubrizol Corporation), having a melting point between 180° C. and 200° C.

The part was submerged into a resin bath containing an Acetophenone 99% liquid solvent, available from Alfa Aesar, maintained at a temperature between 90° C. and 160° C.

The part was also subjected to a drying process. The drying process conditions were as follows:
Processing Chamber temperature: 60-90° C.
Processing Chamber pressure: 5-30 mbar The processing chamber temperature was set at a temperature which is higher than the boiling point of the Acetophenone solvent at the drying pressure of between 5-30 mbar.

As a result, an improved surface finish was observed.

Effective drying of the processed part was also observed.

In this disclosure, unless stated to the contrary, the recital of alternative values for the upper or lower limit of the permitted range of a parameter, is to be construed as an implied statement that each intermediate value of said parameter, lying between the smaller and greater of the alternatives, is itself also disclosed as a possible value for the parameter.

In addition, unless otherwise stated, all numerical values appearing in this application are to be understood as being modified by the term "about".

Although the disclosure has been described above with reference to one or more preferred embodiments, it will be appreciated that various changes or modifications may be made without departing from the scope of the disclosure as defined in the appended claims.

Example 27

As an example, the afore-described methodology was used for processing a powder-based additively manufactured part manufactured via Selective Laser Sintering using an Ultrasint™ grade of Polypropylene (available from BASF SE), having a melting point of 140° C.

The part was held at a temperature between 20° C. and 130° C. and placed into a processing chamber which was then vacuumed to a pressure of between 10 mbar and 400 mbar. A 1,2,4 Trichlorobenzene solvent vapour held at a temperature of between 100° C. and 160° C. was then introduced into the chamber and condensed onto the surface of the part and left for a period of 2 hours. The solvent was then removed from the surface of the part.

The process was also repeated using a different grade of Polypropylene (available from Ricoh), having a melting point of 160° C.

In both instances, an improved surface finish was observed.

Example 28

As an example, the afore-described methodology was used for processing a powder-based additively manufactured part manufactured via Selective Laser Sintering using an Ultrasint™ grade of Polypropylene (available from BASF SE), having a melting point of 140° C.

The part was held at a temperature between 20° C. and 130° C. and placed into a processing chamber which was then vacuumed to a pressure of between 200 mbar and 600 mbar. A dimethylbenzene solvent vapour held at a temperature of between 60° C. and 120° C. was then introduced into the chamber and condensed onto the surface of the part and left for a period of 2 hours. The solvent was then removed from the surface of the part.

The process was also repeated using a different grade of Polypropylene (available from Ricoh), having a melting point of 160° C.

In both instances, an improved surface finish was observed.

The invention claimed is:

1. A method for post-processing a powder-based additively manufactured part, the method comprising the steps of:
providing a powder-based additively manufactured part, the additively manufactured part comprising a material having a melting point;
providing a fluid for processing the additively manufactured part in order to improve the surface finish of the additively manufactured part;
a heating step, wherein the fluid is heated; and
an application step, wherein the heated fluid is applied to a surface of the additively manufactured part,
wherein the fluid comprises at least one acetal; and
wherein the at least one acetal is selected from one or more of formaldehyde dibutyl acetal, aminoacetaldehyde dimethyl acetal, acetaldehyde diethyl acetal, acrolein diethyl acetal, phenylacetaldehyde dimethyl acetal, anisaldehyde dimethyl acetal, citral diethyl acetal, 2,2-diethoxyacetophenone, and ethyl diethoxyacetate.

2. The method according to claim 1, wherein the fluid further comprises one or more of acetophenone and an acid.

3. The method according to claim 2, wherein the at least one acetal comprises anisaldehyde dimethyl acetal.

4. The method according to claim 1, wherein the at least one acetal is an acetal having a boiling point of at least 100° C.

5. The method according to claim 1, wherein the at least one acetal comprises formaldehyde dibutyl acetal.

6. The method according to claim 1, wherein the additively manufactured part comprises a material having a degree of crystallinity in the range of 15% to 60%.

7. The method according to claim 1, wherein the part is manufactured from a polymer, and wherein said polymer comprises a polyalkylene.

8. The method according to claim 7, wherein the polyalkylene comprises polypropylene.

9. The method according to claim 1, wherein the heating step comprises heating the fluid to a temperature below the melting point of the material of the additively manufactured part.

10. The method according to claim 1, wherein the heating step comprises heating the fluid to a temperature no less than 80° C. below the melting point of the material of the additively manufactured part.

11. The method according to claim 1, wherein the heating step comprises heating the fluid to a temperature in the range of 80° C. and 160° C.

12. The method according to claim 1, wherein the heating step comprises heating the fluid to a temperature up to a maximum of 5° C. below the melting point of the material of the additively manufactured part.

13. The method according to claim 1, wherein said material comprises polypropylene and
wherein the fluid further comprises acetophenone.

14. The method according to claim 1,
wherein the material comprises a polyaryletherketone;
wherein the fluid further comprises at least one acid; and
wherein the fluid is in the form of a liquid and the application step comprises submerging the additively manufactured part in the liquid.

15. The method according to claim 14, wherein the at least on acid comprises an organic acid or an inorganic acid; wherein the organic acid is dichloroacetic acid; and wherein the inorganic acid is sulfuric acid.

16. The method according to claim 1, wherein the material of the additively manufactured part comprises polyether ether ketone (PEEK) or polyether ketone ketone (PEKK).

17. The method according to claim 1, wherein the step of providing the powder-based additively manufactured part comprises a step of sintering to form the powder-based additively manufactured part.

18. The method according to claim 17, wherein the step of sintering comprises selective laser sintering.

19. The method according to claim 1, wherein the fluid is in the form of a vapour and the application step comprises condensing the vapour onto a surface of the additively manufactured part.

20. The method according to claim 1, wherein the heating step comprises heating the fluid to a temperature up to a maximum of 10° C. below the melting point of the material of the additively manufactured part.

21. The method according to claim 1, wherein the heating step comprises heating the fluid to a temperature up to a maximum of 20° C. below the melting point of the material of the additively manufactured part.

* * * * *